(12) United States Patent
Le Floch

(10) Patent No.: US 10,003,806 B2
(45) Date of Patent: Jun. 19, 2018

(54) OPTIMIZED PLENOPTIC IMAGE ENCODING

(71) Applicant: CANON KABUSHIKI KAISHA, Tokyo (JP)

(72) Inventor: Hervé Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 15/041,877

(22) Filed: Feb. 11, 2016

(65) Prior Publication Data

US 2016/0241855 A1 Aug. 18, 2016

(30) Foreign Application Priority Data

Feb. 16, 2015 (GB) .................................. 1502585.1

(51) Int. Cl.
| | | |
|---|---|---|
| *G06K 9/36* | (2006.01) | |
| *H04N 19/136* | (2014.01) | |
| *H04N 19/119* | (2014.01) | |
| *H04N 19/172* | (2014.01) | |
| *H04N 19/103* | (2014.01) | |

(52) U.S. Cl.
CPC ......... *H04N 19/136* (2014.11); *H04N 19/103* (2014.11); *H04N 19/119* (2014.11); *H04N 19/172* (2014.11)

(58) Field of Classification Search
CPC .. H04N 19/597; H04N 19/136; H04N 19/119; H04N 19/172; H04N 13/0011; H04N 13/0048; H04N 2013/0074
See application file for complete search history.

(56) References Cited

U.S. PATENT DOCUMENTS

| 6,476,805 | B1 | 11/2002 | Shum et al. |
| 8,103,111 | B2 * | 1/2012 | Horie ................. G02B 27/2214 |
| | | | 348/222.1 |
| 8,155,456 | B2 | 4/2012 | Babacan et al. |
| 8,559,705 | B2 * | 10/2013 | Ng ............................ G06T 5/50 |
| | | | 345/157 |
| 9,269,163 | B2 * | 2/2016 | Le Floch ................. G06T 9/007 |
| 2008/0152215 | A1 | 6/2008 | Horie et al. |

(Continued)

FOREIGN PATENT DOCUMENTS

| GB | 2524956 A | 10/2015 |
| JP | 2013175843 A | 9/2013 |
| WO | 2015/106031 A2 | 7/2015 |

OTHER PUBLICATIONS

Patents Act 1977: Examination Report under Section 18(3) for GB Patent Application No. 1407631.9, dated Oct. 27, 2016.

(Continued)

*Primary Examiner* — Li Liu
(74) *Attorney, Agent, or Firm* — Canon USA, Inc. I.P. Division

(57) ABSTRACT

At least one embodiment of a method of encoding a plenoptic image includes: decomposing the plenoptic image into sub-aperture images, encoding at least a part of a first sub-aperture image using a set of encoding parameters, and encoding at least a part of a second sub-aperture image using a restricted number of parameters among the set of encoding parameters. Embodiments make it possible to reduce the encoding complexity and run-time while keeping good encoding performances.

15 Claims, 22 Drawing Sheets

(56) References Cited

U.S. PATENT DOCUMENTS

| | | | | |
|---|---|---|---|---|
| 2012/0249550 A1* | 10/2012 | Akeley | ............... | H04N 5/232 |
| | | | | 345/419 |
| 2014/0146201 A1* | 5/2014 | Knight | ................. | H04N 9/04 |
| | | | | 348/231.99 |
| 2015/0201176 A1* | 7/2015 | Graziosi | ............ | H04N 13/0011 |
| | | | | 348/43 |
| 2015/0319456 A1* | 11/2015 | Le Floch | ............ | H04N 19/196 |
| | | | | 375/240.12 |
| 2016/0173883 A1* | 6/2016 | Lawrence | ............ | H04N 19/14 |
| | | | | 348/46 |
| 2016/0366442 A1* | 12/2016 | Liu | ................... | H04N 19/597 |

OTHER PUBLICATIONS

Ng, Ren, et al., "Digital Light Field Photography", Dissertation, Jul. 2006.
Lumsdaine, Andrew, et al., "Full Resolution Lightfield Rendering", Adobe Technical Report, Jan. 2008, Adobe Systems Inc.
Combined Search and Examination Report for GB Patent Application No. 1407631.9, dated Oct. 24, 2014.
Combined Search and Examination Report for GB Patent Application No. 1502585.1, dated Aug. 12, 2015.

* cited by examiner

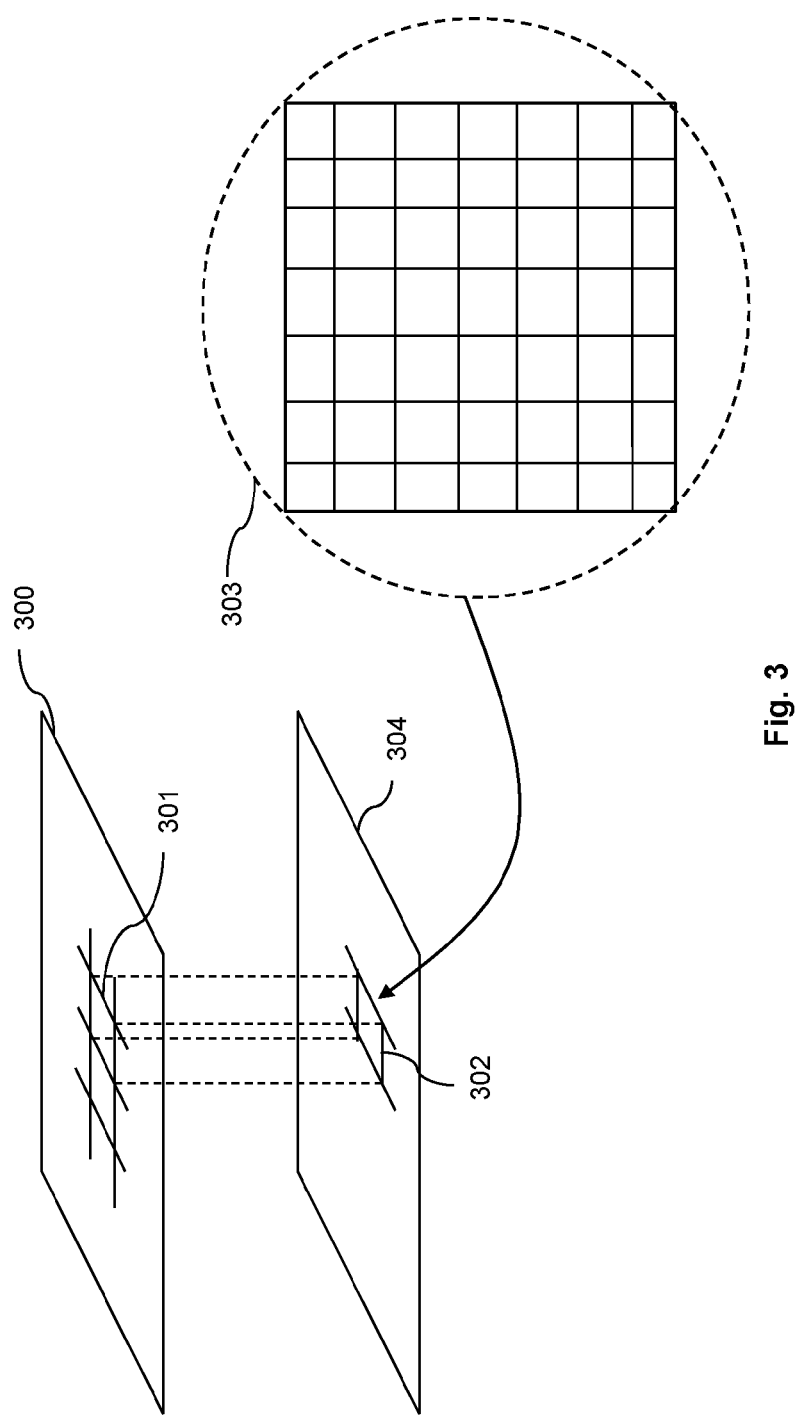

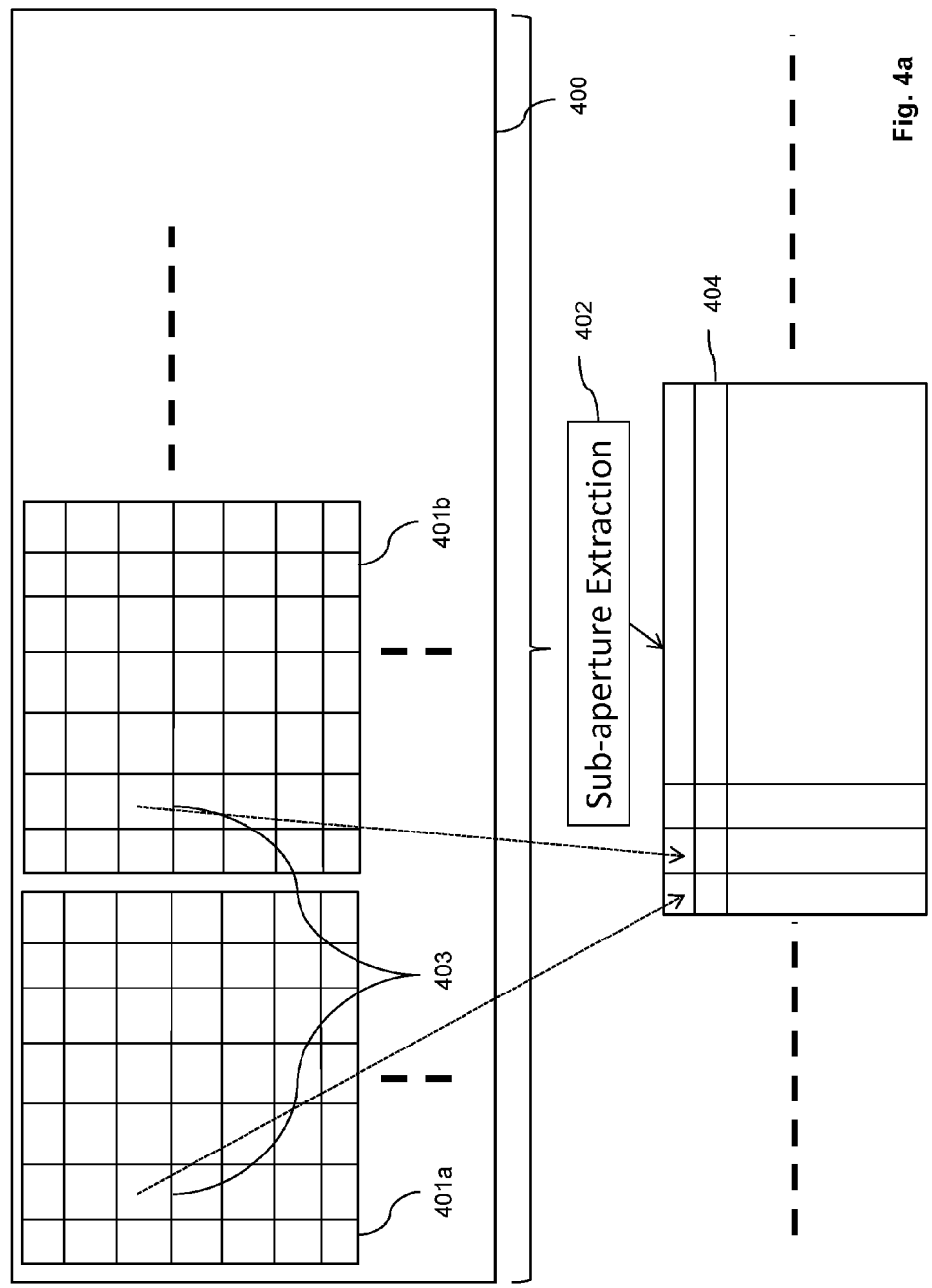

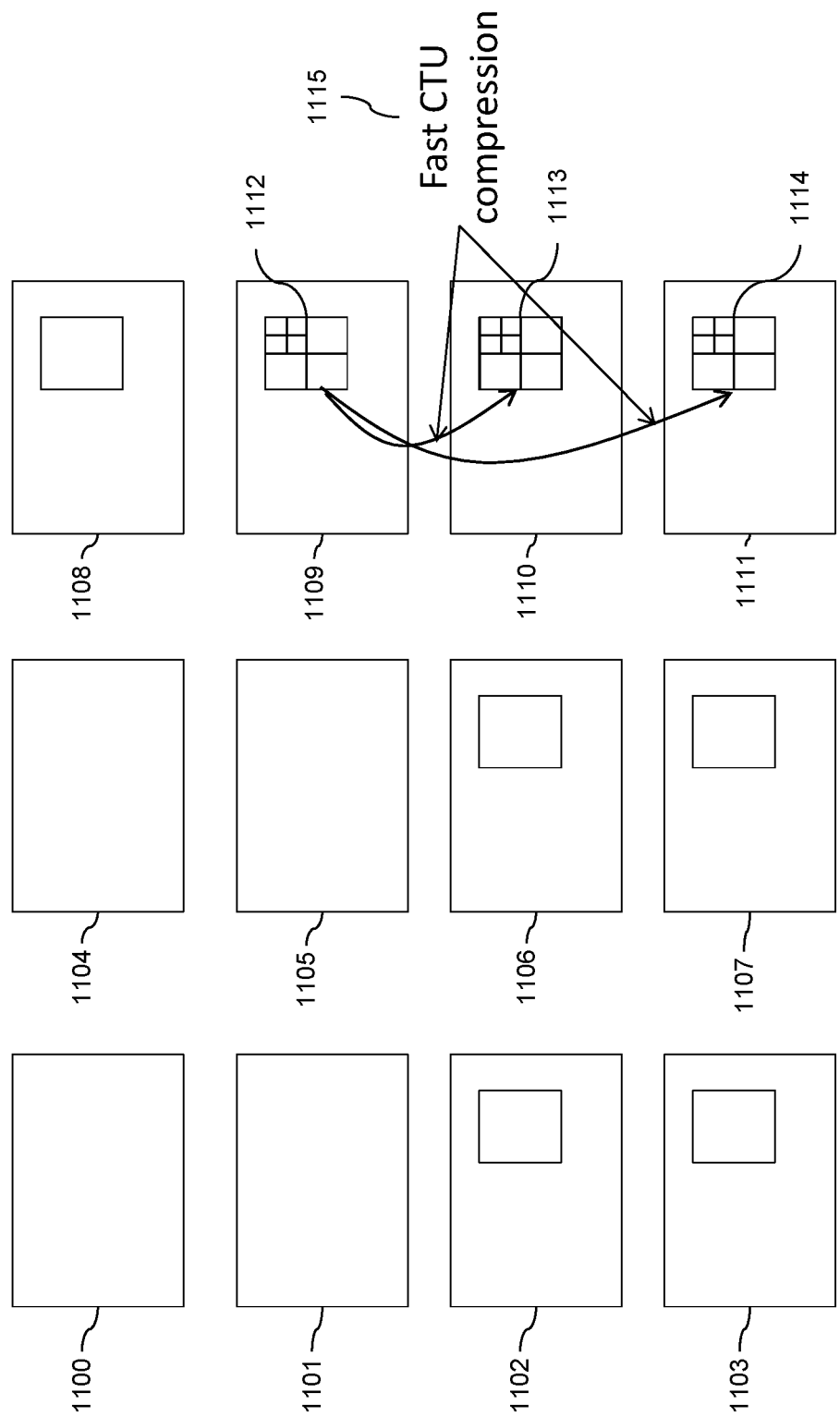

OPTIMIZED PLENOPTIC IMAGE ENCODING

CROSS-REFERENCE TO RELATED APPLICATION(S)

This application claims the benefit under 35 U.S.C. § 119(a)-(d) of United Kingdom Patent Application No. 1502585.1, filed on Feb. 16, 2015 and entitled "Optimized plenoptic image encoding". The above cited patent application is incorporated herein by reference in its entirety.

FIELD OF THE INVENTION

The present invention relates to the encoding of light field images and/or videos, in particular the encoding of plenoptic images and/or videos.

BACKGROUND OF THE INVENTION

Still plenoptic images are 2D images captured by specific plenoptic systems. Such systems differ from the conventional camera systems.

Plenoptic systems have been described, for example, in documents Lumsdaine et Georgiev "*Full resolution light-field rendering*" tech. rep., Adobe Systems, Inc. (January 2008) and "Digital Light Field Photography", Dissertation submitted to the department of computer science and the committee on graduate studies of Standford University in partial fulfillment of the requirements for the degree of doctor of philosophy, Ren Ng (July 2006).

In such systems, an array of micro-lenses is disposed between an image sensor and a main lens of the camera. A given number of pixels are located underneath each microlens. The sensor captures pixel values through the array that are related to the location and the orientation of light rays inside the main lens.

The optical arrangement of plenoptic systems makes it possible to change the refocusing plane of the 2D images after they have been captured by image processing. Changing the refocusing point makes it possible to modify the sharpness and the blur on the objects located at different depth in the 3D scene represented by the 2D image.

Advantageously, several 2D images with respective and different focalization points can be generated using refocusing from a single plenoptic image. This makes it possible to simulate different camera parameters (e.g. the camera aperture, the focusing plane, etc.). Also, the point of view can be slightly changed by image processing and the 3D depth of the scene may be recalculated.

Plenoptic systems may be cameras and also camcorders. In the latter case, a plurality of images are captured for forming a video, each image captured being a plenoptic image.

The compression (or encoding) algorithms used for compressing (or encoding) plenoptic images and plenoptic videos usually require long run times. Therefore, any improvement in term of compression run time is interesting.

Compression methods directed to light field or plenoptic images have been disclosed in documents U.S. Pat. Nos. 6,476,805, 8,103,111 and 8,155,456.

However, the methods disclosed do not fit in standard encoding algorithms used for encoding standard (non-plenoptic) images.

This may limit the development of the use of plenoptic systems although they provide advantageous features.

Thus, the inventors brought into light the fact that there is still a need for plenoptic images and/or video encoding techniques that are compatible with current (non-plenoptic) image and/or video encoding standards. In particular, there is still a need for plenoptic images and/or video encoding techniques with reduced run times.

The present invention lies within this context.

SUMMARY OF THE INVENTION

According to a first aspect of the invention there is provided a method of encoding a plenoptic image comprising:
  decomposing said plenoptic image into sub-aperture images,
  encoding at least a part of a first sub-aperture image using a set of encoding parameters, and
  encoding at least a part of a second sub-aperture image using a restricted number of parameters among said set of encoding parameters.

The encoding may be understood as the source encoding or "compression" in what follows.

Embodiments make it possible to reduce the encoding complexity and run-time while keeping good encoding performances.

Embodiments may be carried out with images/videos that make it possible to obtain sub-aperture images (as described hereinafter) are considered. Plenoptic images/videos of type 1.0 are of that type According to embodiments, the part of the first sub-aperture image and the part of the second sub-aperture image are collocated in the first sub-aperture image and the second sub-aperture image.

According to embodiments, the sub-aperture images are indexed and the second sub-aperture image has an index value higher than an index value of the first sub-aperture image.

For example, the first and second sub-aperture images have successive indexes.

According to embodiments, the sub-aperture images are indexed and organized into layers, the layers are indexed and the second sub-aperture image belongs to a layer having an index value higher than an index value of a layer to which belongs the first sub-aperture image.

For example the first and second sub-aperture images belong to successive layers.

According to embodiments, the encoding of the part of the first sub-aperture image is preceded by a step of optimizing the encoding parameters.

According to embodiments, at least one encoding parameter of said restricted number of encoding parameters is an encoding mode and wherein at least one encoding mode is discarded when encoding said part of said second sub-aperture image.

According to embodiments, said encoding mode is discarded based on a probability of use of said encoding mode for encoding a current image portion of a current sub-aperture image to be encoded.

According to embodiments, said encoding mode is discarded based on a coding efficiency encoding for encoding a current image portion of a current sub-aperture image to be encoded.

According to embodiments, said at least one encoding mode is discarded based on a position of a current image portion of a current sub-aperture image to be encoded according to an index order for said predictive encoding.

According to embodiments, at least one encoding parameter of said restricted number of encoding parameters is a subdivision pattern for subdividing a current part of a current sub-aperture image to be encoded and wherein at least one subdivision pattern is discarded in view of encoding said part of said second sub-aperture image.

According to embodiments, the subdivision pattern used for subdividing the part of the second sub-aperture image is limited to a subdivision pattern used for subdividing an already encoded part of a sub-aperture image to be used for encoding said part of said second sub-aperture image.

According to embodiments, the subdivision pattern used for subdividing the current image portion of the current sub-aperture image is searched for in a set of subdivision patterns, said set of subdivision patterns being defined based on a subdivision depth of a subdivision pattern used for subdividing an already encoded part of a sub-aperture image to be used for encoding said part of said second sub-aperture image.

According to embodiments, the set of subdivision patterns comprises patterns having a same subdivision depth as the subdivision pattern used for subdividing an already encoded part of a sub-aperture image to be used for encoding said part of said second sub-aperture image.

According to embodiments, the set of subdivision patterns comprises patterns having a subdivision depth lower than the subdivision depth of the subdivision pattern used for subdividing an already encoded part of a sub-aperture image to be used for encoding said part of said second sub-aperture image.

According to embodiments, said at least one subdivision pattern is discarded based on a position of the part of the second sub-aperture image to be encoded according to an index order for said encoding.

According to embodiments, at least one parameter of said restricted number of parameters is a reference image type for encoding said part of said second sub-aperture image and wherein at least one reference image type is discarded in view of encoding said part of said second sub-aperture image.

According to embodiments, said at least one reference image type is discarded based on at least one encoding type used for encoding subdivisions of an already encoded part of an already encoded sub-aperture image to be used for encoding said part of said second sub-aperture image.

According to embodiments, said at least one encoding type is at least one of:
a temporal encoding, and/or
an inter-layer encoding and/or,
a spatial encoding.

According to embodiments, said reference image type is discarded based on a proportion of encoding types used for encoding said subdivisions.

According to embodiments, for at least one part of a sub-aperture image to be encoded, both a first encoding and a second encoding are performed,
said first encoding uses said set of encoding parameters and said second encoding uses said restricted number of parameters among said set of encoding parameters,
a performance indicator is evaluated for said first and second encoding, and
a selection between encoding with said set of parameters or said restricted number of parameters optimization is performed for encoding subsequent parts of sub-aperture images.

According to embodiments, said performance indicator is a rate-distortion indicator.

According to embodiments, said performance indicator is linear combination of a rate of the image part and a distortion of the image part.

According to embodiments, encoding with said restricted number of parameters is selected when the performance parameter for the first and the second encoding do not differ more than 10%.

According to a second aspect of the invention there is provided a device comprising a processing unit configured to carry out a method according to the first aspect.

According to a third aspect of the invention there are provided computer programs and computer program products comprising instructions for implementing methods according to the first aspect of the invention, when loaded and executed on computer means of a programmable apparatus.

The objects according to the second and third aspects of the invention provide at least the same advantages as those provided by the method according to the first aspect.

BRIEF DESCRIPTION OF THE DRAWINGS

Features and advantages of the invention will become apparent from the following description of non-limiting exemplary embodiments, with reference to the appended drawings, in which.

DETAILED DESCRIPTION OF THE INVENTION

In what follows, embodiments of a method for decreasing the complexity of the source encoding of plenoptic videos for their compression are described. The embodiments are described with reference to the HEVC or MV-HEVC video encoding algorithms.

However, the invention is not limited to encoding of videos (images may also be compressed) and is not limited to the above exemplary encoding algorithms.

In the following description, the HEVC or MV-HEVC encoders are tuned for decreasing the encoding run-time by taking into account the characteristics and specificities of the plenoptic images.

The embodiments described make it possible to decrease the run-time of the encoding algorithms for plenoptic videos while keeping a good encoding ratio.

In the following description, the source encoding of plenoptic videos for their compression is referred to the "compression" of the plenoptic videos. The terms "encoding" and "compression" may thus be interchangeable.

Figure 1:
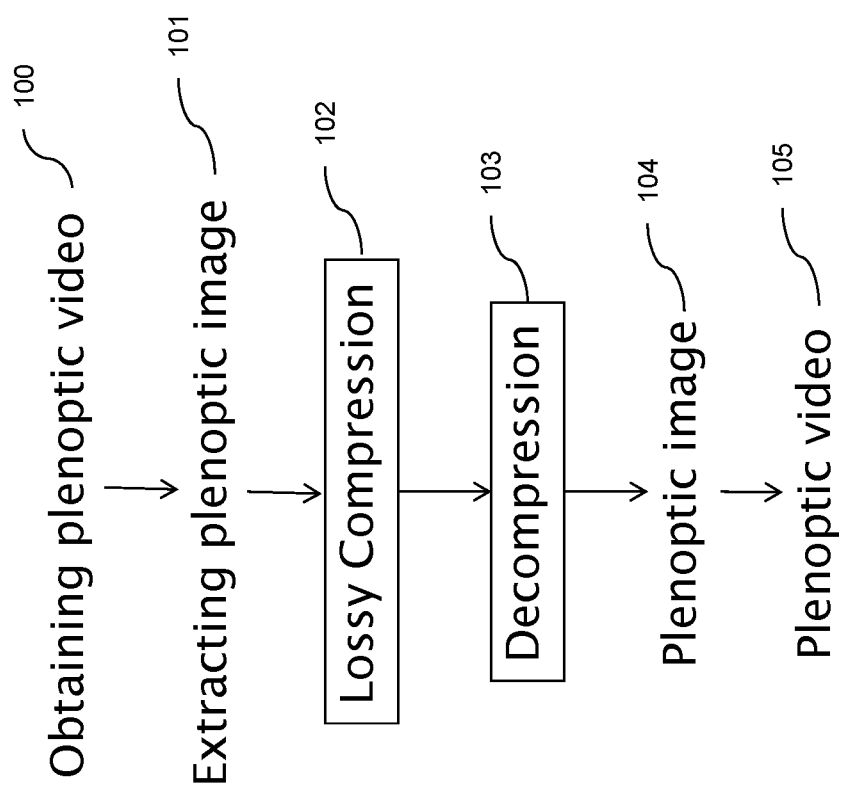
FIG. 1 schematically illustrates a global context of implementation of embodiments, FIGS. 2-3 schematically illustrates the general principle of a plenoptic camera, FIG. 4a schematically illustrates the generation of a sub-aperture image, FIG. 4b schematically illustrates the generation of the indices of sub-aperture images, FIG. 4c schematically illustrates a second generation of the indices of sub-aperture images, FIGS. 5, 6a-6b schematically illustrate image encoding according to embodiments, FIG. 7 schematically illustrates a system according to embodiments.

FIG. 1 illustrates a global context of implementation of embodiments of the invention.

A plenoptic video is made available in step 100 (by reading, acquisition or any other means). This plenoptic video comprises several plenoptic images. During step 101, it is assumed that one image of this video is extracted for being compressed (all the images of the video being successively extracted for being compressed). The selected plenoptic image is compressed using a compression algorithm in step 102. The elementary stream outputted by this compression step is added to the elementary stream of the other plenoptic images already compressed. Once all the images of the video have been compressed, the final elementary stream can be encapsulated, stored or transmitted over networks for being decompressed in step 103. The result of the decompression is the set of plenoptic images 104 corresponding to the initial plenoptic video. The decompressed plenoptic images are part of a final plenoptic video 105 and are slightly different from the images extracted in step 101 due to the compression artifacts. The visual impact of compression artifacts increases with the compression ratio.

The following embodiments aim at reducing the computation run-time of step 102 for plenoptic images/videos. In particular, plenoptic images/videos are considered, that make it possible to obtain sub-aperture images (as described hereinafter). Plenoptic images/videos of type 1.0 are of that type.

Figure 2:
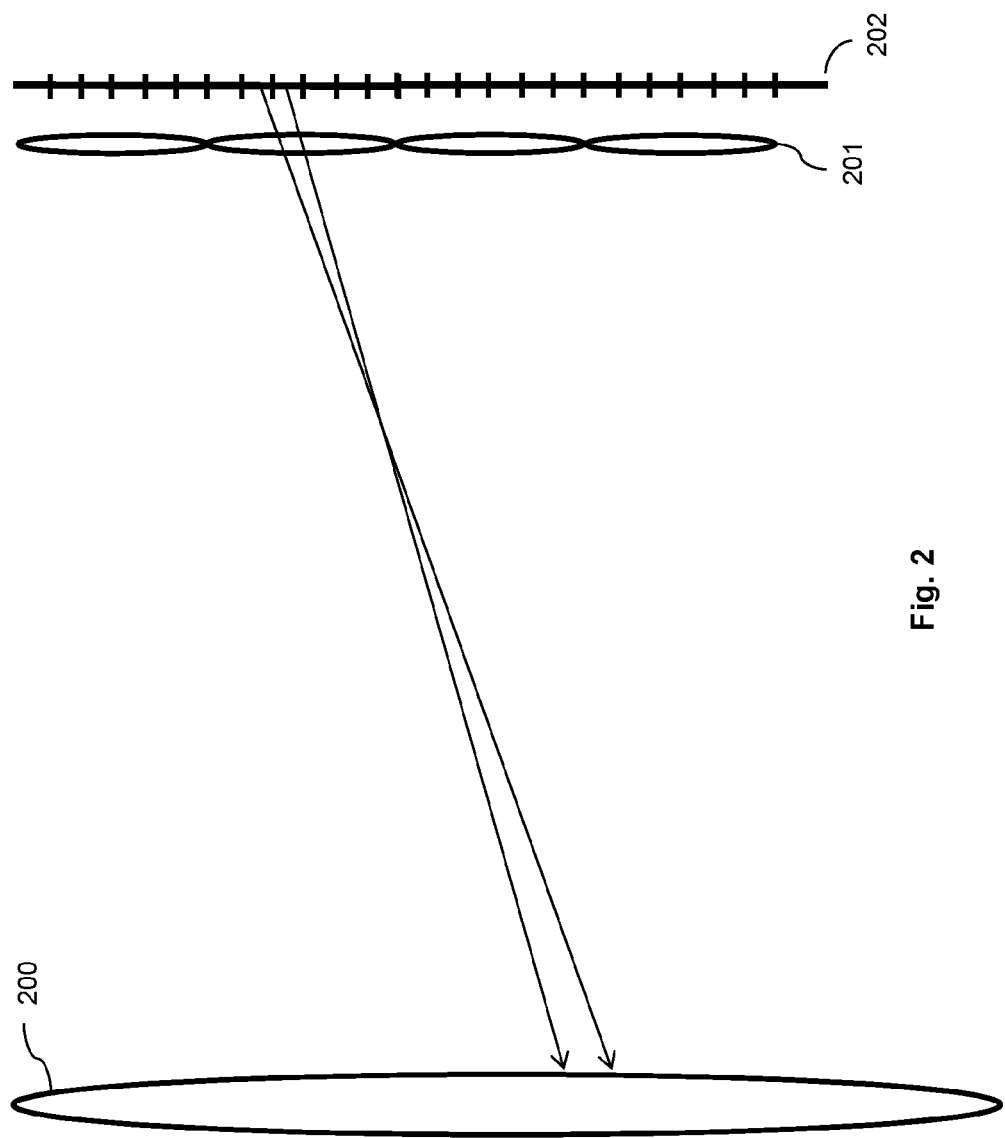

FIG. 2 illustrates the general principle of a plenoptic camera. This illustration is given in 1D for illustrative purposes. The skilled person will easily extend the illustration to 2D.

The camera has a main lens 200. It is assumed here, for the sake of conciseness that the camera has only one lens. However, the camera may have several lenses. An array 201 of micro-lenses is disposed between an image sensor 202 and the main lens.

For plenoptic cameras of type "1.0" (referred to as "plenoptic cameras 1.0"), the distance between the array of micro-lenses and the sensor is equal to the focal distance of the micro-lenses. Plenoptic cameras 1.0 makes it possible to obtain a good sampling of the orientation of the light field inside the camera. The counter-part of this high sampling quality in the light field orientation is a lower spatial resolution.

FIG. 3 illustrates the disposition of an array 300 of micro-lenses comprising a micro-lens 301. A sensor 304 comprises a set of pixels 302. This set of pixels 302 is situated under the micro-lens 301.

The distance between the sensor's plane and the micro-lens array's plane is equal to the focal length of the micro-lens.

View 303 shows in more details the sensor's arrangement. For example, the sensor is an array of pixels in a 7×7 arrangement. Each 7×7 pixels arrangement (e.g. 302) is situated under a respective micro-lens of the array 300 of micro-lenses. The set of 7×7 pixels (302) is illustrated as a set of pixels in (303). The number of pixels or the number of pixels under a given micro-lens is a characteristic of the camera and varies from one camera to another.

The refocusing capability increases with the number of pixels under a micro-lens. The counterpart is a lower spatial resolution.

As illustrated in FIG. 4a, the pixels of the sensor are associated with micro-lens images 401a, 401b (302, 303 in FIG. 3). A micro-lens image is an image composed of the pixels under each micro-lens. From the micro-lens images, "sub-aperture" images are generated as described hereinafter.

A plenoptic image comprises a given set of adjacent micro-lens images MI(x,y), wherein (x,y) are the horizontal and vertical indices of each micro-lens of the array of micro-lenses.

For example, in FIG. 4a, a plenoptic image 400 is represented. For the sake of conciseness, only two micro-lens images MI(0,0) (401a) and MI(1,0) (401b) of the plenoptic image are represented. In FIG. 4a, the micro-lens images are slightly separated but this separation is artificial and is drawn only for the sake of readability of the Figure. As it appears from FIG. 4a, the horizontal axis begins (starting from "0") from the up-left corner of the plenoptic image and extends to the up-right corner. Also, the vertical axis begins (starting from "0") from the up-left corner of the plenoptic image and extends to the down-left corner.

Each micro-lens image MI(x,y) comprises several pixels (49 pixels arranged as a 7×7 array in the present example). The horizontal and vertical indices of the pixel of a given micro-lens are respectively called (u,v). For example, the two pixels 403 in FIG. 4a are referred to as MI(0,0,1,2) and MI(1,0,1,2).

From the plenoptic image 400, several sub-aperture images 402 can be generated. The sub-aperture image is called "SI" and is built from all the pixels with the same coordinates (u,v) in respective micro-lens images.

For example, by extracting all the pixels (u,v) from the micro-lens images, the sub-aperture image SI(u,v) is generated. FIG. 4a illustrates the generation of the sub-aperture image SI(1,2) 404 comprising the pixels on the micro-lens images having (1,2) coordinates.

The generated sub-aperture images may be indexed. As previously discussed, each sub-aperture image SI(u,v) is defined according to the (u,v) coordinates with u between 0 and 'U' and v between 0 and 'V'. In the present example, since there are 7×7 pixels per micro-lens 'U=6' and 'V=6'. The sub-aperture images can be also indexed with a unique index called 'p' with p=v*(U+1)+u+1. In the present example with 7×7 pixels per micro-lens, p varies between 1 and (U+1)×(V+1). Any other indexing may be used for differentiating the sub-aperture images SI(u,v).

Figure 4B:
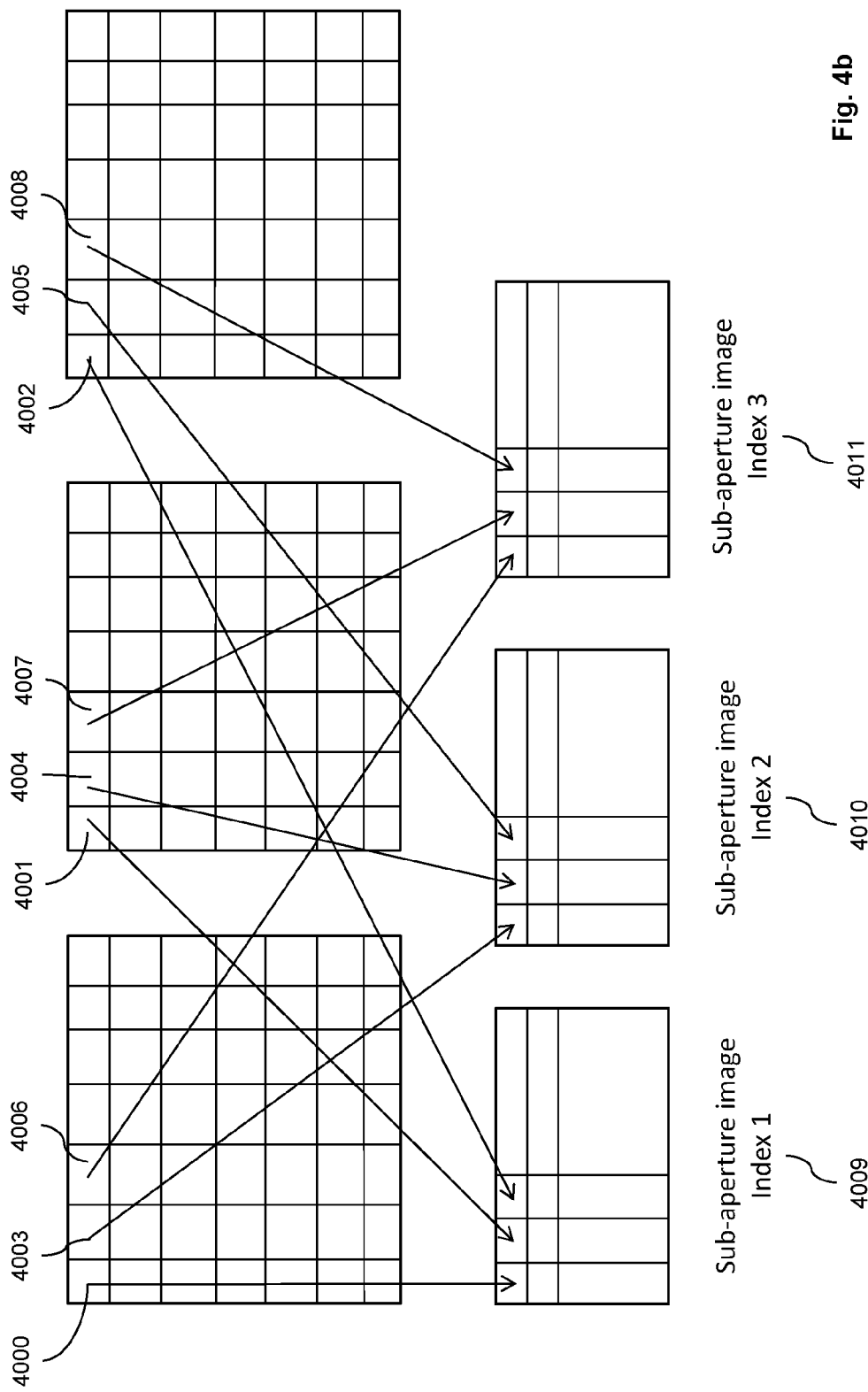

FIG. 4b gives an example of indexing as discussed above (p=v*(U+1)+u+1). The sub-aperture image with index 1 is generated by assembling all the pixels of the micro-lens images with a same coordinate (u,v)=(0,0). This is illustrated in FIG. 4b wherein 3 micro-lens images are drawn. From these micro-lens images, sub-aperture images are generated. For example, the sub-aperture image with index '1' (4009) is generated by taking all the pixels (4000, 4001, 4002) in the sub-aperture image (4009). The sub-aperture image with index '2' (4010) is generated by taking all the pixels (4003, 4004, 4005) in the sub-aperture image (4010). The sub-aperture image with index '3' (4011) is generated by taking all the pixels (4006, 4007, 4008) in the sub-aperture image (4011).

Figure 4C:
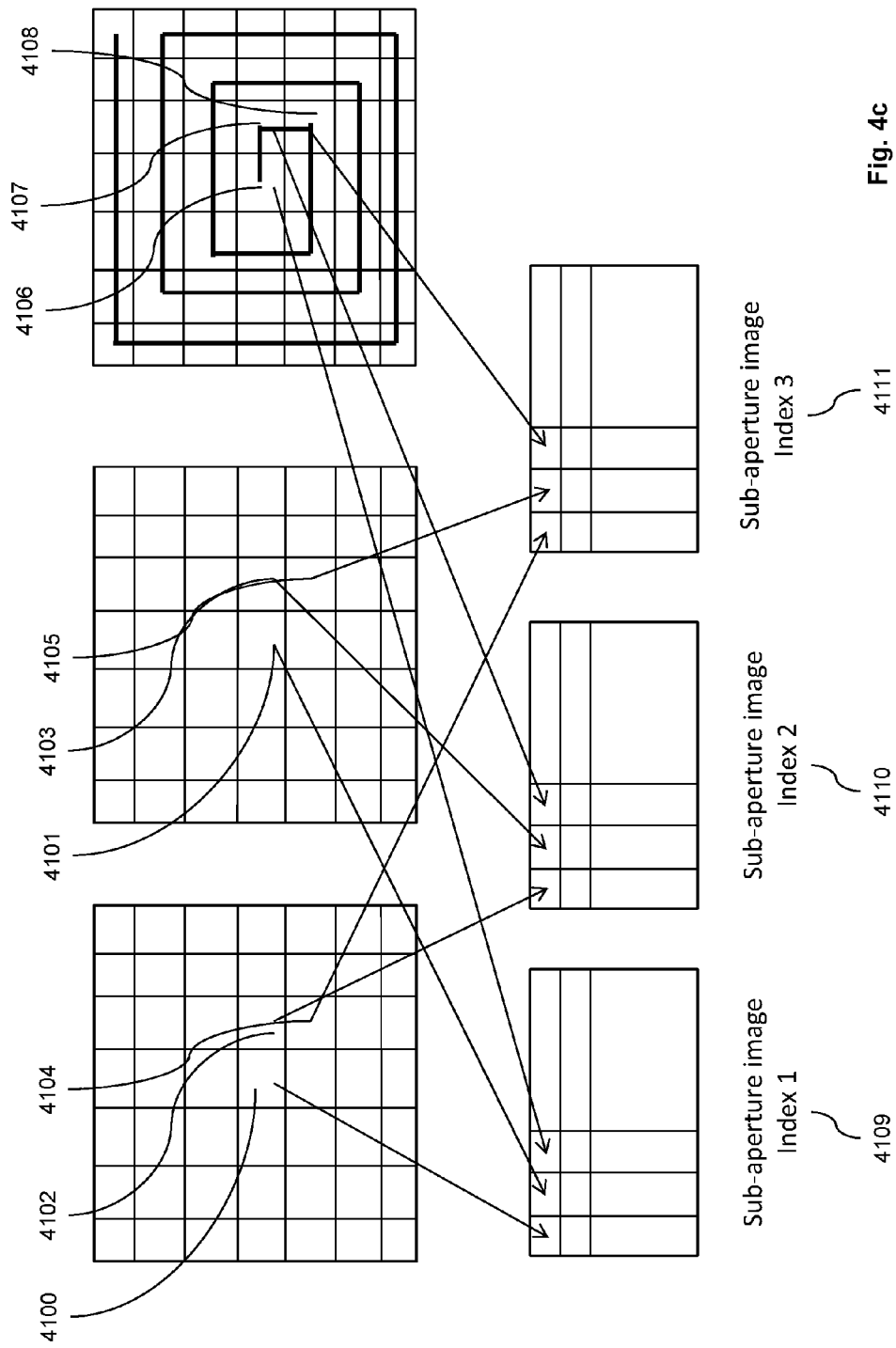

The FIG. 4c gives another example for generating the sub-aperture images with a given associated index. In this example, the order of the sub-aperture images follows a spiral order. For generating the sub-aperture image with index 1, the center of each micro-lens image is taken. For example, the sub-aperture image with index 1 (4109) is generated by taking the pixels at the center of the micro-lens image. This is illustrated with pixels 4100, 4101, 4106. The sub-aperture image with index 2 (4110) is generated by taking the pixel following the center of the micro-lens image according to a spiral order. This is illustrated with pixels 4102, 4103, 4107. The sub-aperture image with index 3 (4111) is generated by taking the next pixels according to a spiral order. This is illustrated with the pixels 4104, 4105, 4108.

Figure 5:
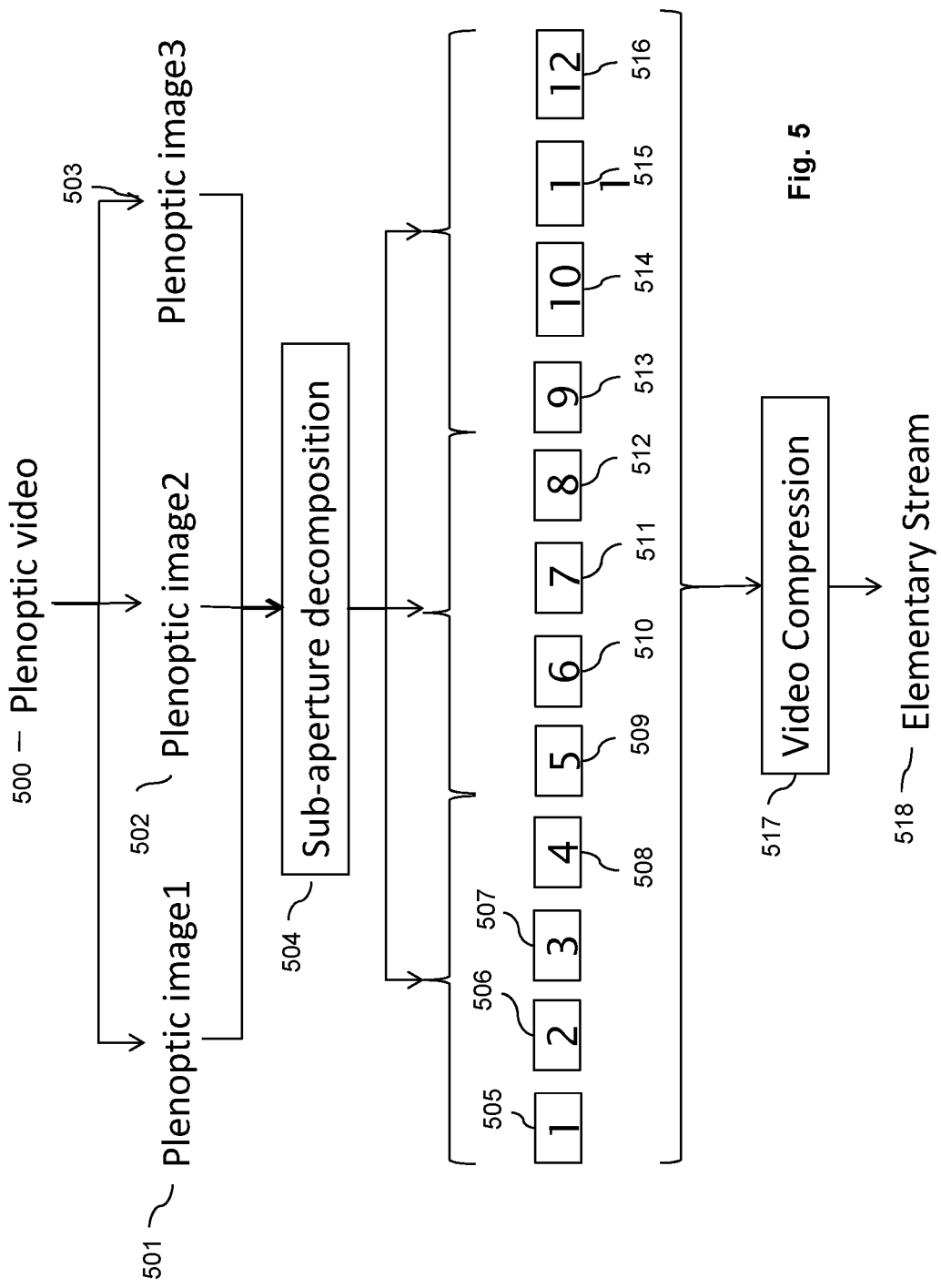

Sub-aperture images are used in the compression process as described hereinafter with reference to FIG. 5.

In step 500, a plenoptic video is made available. For illustrative purposes, it is assumed that this video comprises three plenoptic images 501, 502 and 503. For each plenoptic image of the video, sub-aperture images are generated in step 504. For the sake of conciseness, it is assumed that for each plenoptic image, four sub-aperture images are generated (we thus assume that each micro-lens corresponds to four pixels). Of course, these numbers are not limitative and any other number of plenoptic images and/or pixels per micro-lens may be envisaged.

For the demosaicking stage and white balancing, gamma correction operations, that are typically performed, the skilled person can refer to state of the art techniques.

Back to the three plenoptic images of the present example, the following steps are carried out:
  plenoptic image 501 is decomposed into four sub-aperture images 505, 506, 507 and 508,
  plenoptic image 502 is decomposed into four sub-aperture images 509, 510, 511 and 512,
  plenoptic image 503 is decomposed into four sub-aperture images 513, 514, 515 and 516.

After decomposition, twelve sub-aperture images are obtained (505 to 516). These sub-aperture images are compressed in step 517 using a video compression algorithm. An elementary stream 518 is thereby generated.

For example, the compression algorithm is MPEG-1, MPEG-2, H264, HEVC, H264 or the like. These examples are not limitative and in what follows, the HEVC and MV-HEVC video compression algorithms are taken as examples. MV-HEVC is a modified version of HEVC that makes it possible to compress a video as a set of layers.

Details concerning MV-HEVC may be found in JCT-3V AHG report: MV-HEVC/3D-HEVC Test Model editing (AHG3), Document: JCT3V-F0003, 6th Meeting: Geneva, CH, 25 Oct.-1 Nov. 2013. Details concerning HEVC may be found in see JCTVC-L1003, "HEVC text specification Draft 10/FDIS & Consent text", 12th JCT-VC meeting, Geneva, January 2013.

Figure 6A:
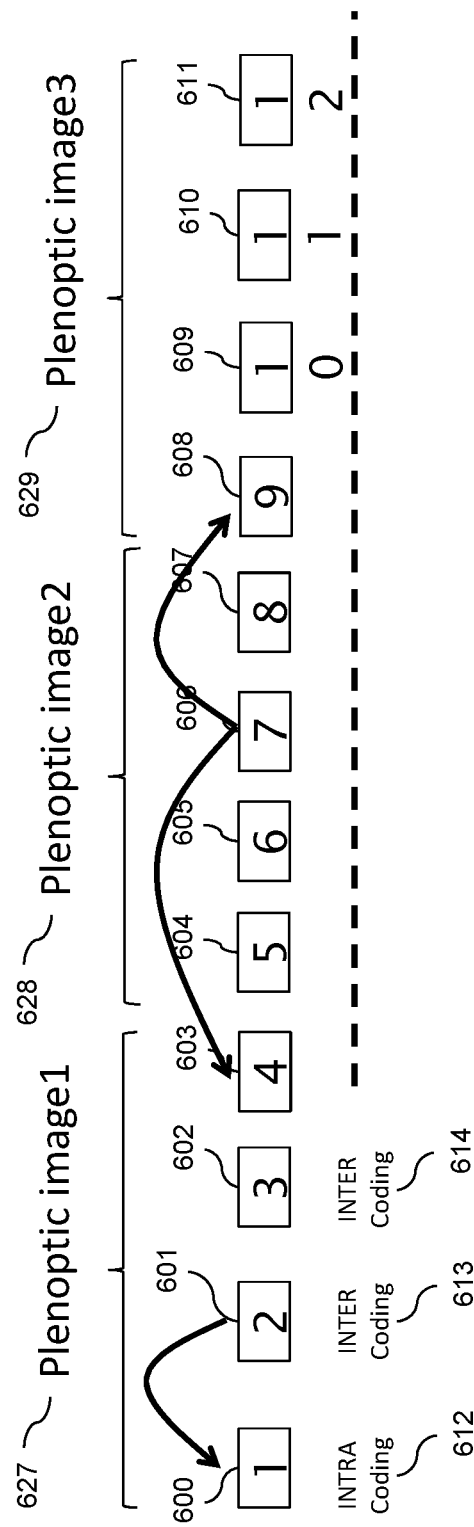

The video compression is described in more details with reference to FIG. 6a.

It is assumed that each plenoptic image of the video is decomposed into four sub-aperture images. The number of sub-aperture images may be different depending on the number of pixels under each micro-lens. It is also assumed that four pixels in a 2×2 arrangement are used per micro-lens. Finally, it is assumed that the plenoptic video comprises three plenoptic images 627, 628 and 629.

The four sub-aperture images 600, 601, 602 and 603 correspond to the plenoptic image 627. The four sub-aperture images 604, 605, 606 and 607 correspond to the plenoptic image 628. The four sub-aperture images 608, 609, 610 and 611 correspond to the plenoptic image 629.

These twelve sub-aperture images (600 to 611) can be considered as a single and common video. Different predictive schemes can be used for compressing the sub-aperture images.

For example, INTRA encoding 612 can be used for some sub-aperture images. In such a case, each sub-aperture image is self-sufficient and is encoded without references to other sub-aperture images. Typically, the first sub-aperture image 600 of the video is encoded as an INTRA image. For INTRA encoding, encoding tools as those described in JCTVC-L1003, "HEVC text specification Draft 10/FDIS & Consent text", 12th JCT-VC meeting, Geneva, January 2013 and as those discussed in what follows with reference to FIG. 7 can be used (Coding Tree Units and Coding Units representation, spatial prediction, quantization, entropy coding, etc.).

Sub-aperture images can also be encoded using INTER encoding 613, 614. For this predictive coding mode, the image (e.g. 601 and/or 602) is encoded with reference to another image (e.g. 600). This mode makes it possible to encode the current image by using a temporal prediction in addition to the spatial prediction.

As already described hereinabove, the plenoptic images can be decomposed into four sub-aperture images. The first generated sub-aperture image is associated with an image index "1". The second generated sub-aperture image is associated with an image index "2". The third generated sub-aperture image is associated with an image index "3". The fourth generated sub-aperture image is associated with an image index "4". As described with reference to FIGS. 4a, 4b and 4c, the indices of the plenoptic images can be generated in several ways.

As described in what follows, the sub-aperture images may be organized in layers, using their indexation.

Some compression schemes are based on inter-layer prediction. Such compression schemes can be used as an alternative to (or in combination with) the compression schemes discussed with reference to FIG. 6a.

An example of compression scheme offering inter-layer prediction is given in JCT-3V AHG report: MV-HEVC/3D-HEVC Test Model editing (AHG3), Document: JCT3V-F0003, 6th Meeting: Geneva, CH, 25 Oct.-1 Nov. 2013. This compression scheme is called MV-HEVC. This compression scheme is discussed with reference to FIG. 6b.

It is assumed that each plenoptic image of the video is decomposed into four sub-aperture images. The number of sub-aperture images may be different depending on the number of pixels under each micro-lens. It is also assumed that four pixels per micro-lens in a 2×2 arrangement are used. Finally, it is also assumed that the plenoptic video comprises three plenoptic images 627, 628 and 629.

The four sub-aperture images 615, 616, 617 and 618 correspond to the plenoptic image 627. The four sub-aperture images 619, 620, 621 and 622 correspond to the plenoptic image 628. The four sub-aperture images 623, 624, 625 and 626 correspond to the plenoptic image 629.

The sub-aperture images are organized into layers (or "views"). For example, four layers are defined as follows:
  Layer 1, with layer index "p=1" (p being defined in FIG. 4a), contains sub-aperture images 615, 619 and 623.
  Layer 2, with layer index "p=2", contains sub-aperture images 616, 620 and 624.
  Layer 3, with layer index "p=3", contains sub-aperture images 617, 621 and 625.

Layer 4, with layer index "p=4", contains sub-aperture images 618, 622 and 626. Multi-view compression algorithms like MV-HEVC make it possible to compress the layers. The first layer/view is encoded as an independent video. The second layer/view is encoded with reference to the first one and with reference to other already encoded images of the same layer. The third layer/view is encoded with reference to the first and second layers/views and with reference to other already encoded images of the same layer/view and so on.

MV-HEVC uses the same basic tools as HEVC. The compression comprises:

Constructing a reference buffer of already encoded images (called DPB for "Decoded Pictures Buffer"). The images of this buffer can come from the same layer or from other already encoded layers with same temporal reference.

Predicting the current image to be compressed from images of the DPB.

Optimizing the prediction parameters for compressing the current image.

Coding the residual and the prediction parameters by entropy coding.

MV-HEVC makes it possible to carry out:

INTRA compression: the sub-aperture image 615 is encoded without any reference to another image.

Temporal/INTER compression: the sub-aperture image 625 can be encoded with reference to images 617 and 621.

Inter-layer/INTER compression: the sub-aperture image 625 can be encoded with reference to images 623 and/or 624.

Combination of temporal and inter-layer prediction is also possible, provided that appropriate images are stored in the DPB.

Figure 7:
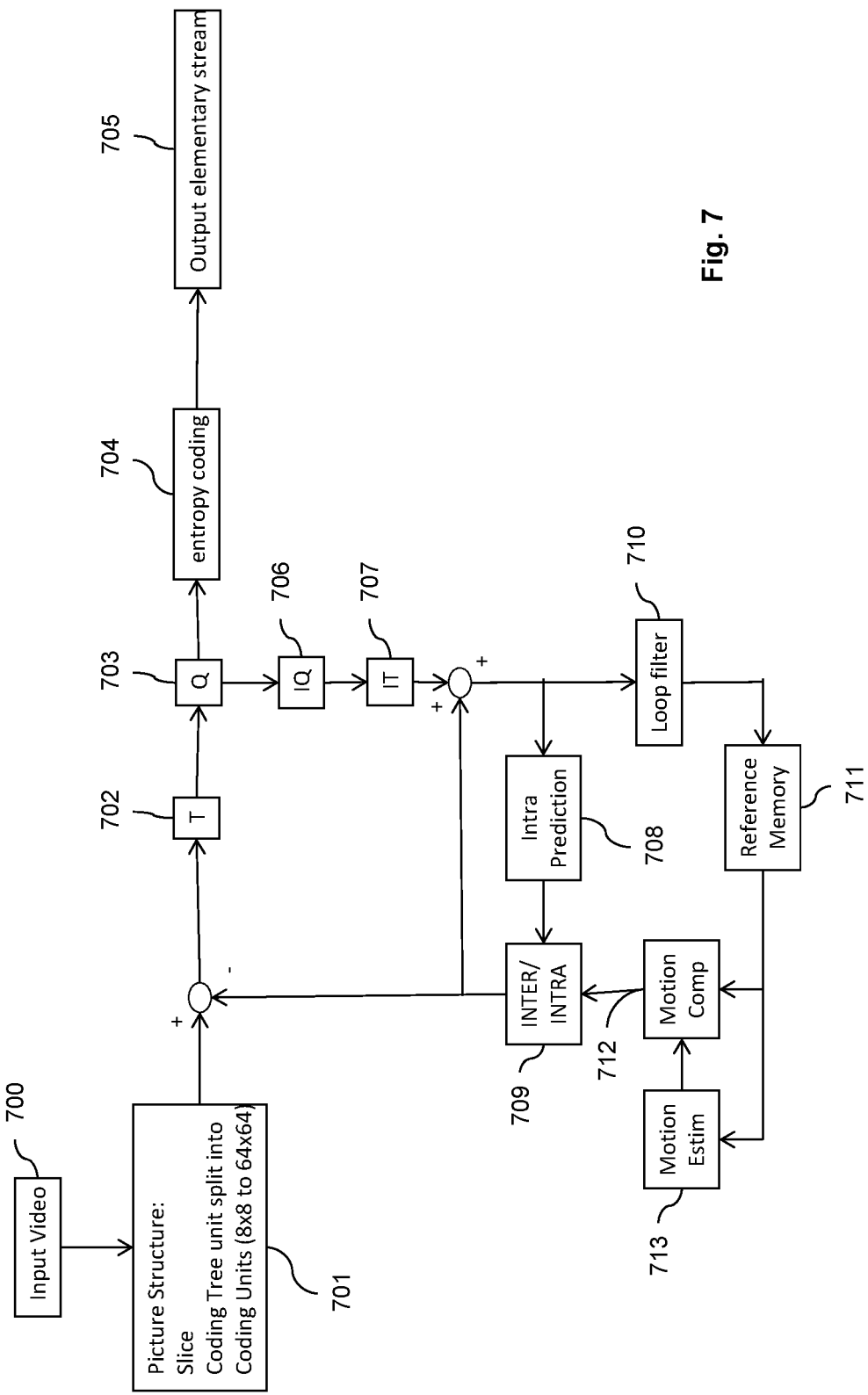

Video compression according to embodiments is now described with reference to the general system of FIG. 7. The example of an HEVC video encoder is taken but the invention can be generalized to other encoders like H264 or MPEG-2.

A video is input to an input module 700. The video comprises a set of sub-aperture images as already described hereinabove (e.g. sub-aperture images 505 to 516 in FIG. 5, sub-aperture images 600 to 611 in FIG. 6a, sub-aperture images 615 to 626 in FIG. 6b). Each image of the video is successively selected for being structured into slices, Coding Tree Units and/or Coding Units by a structuring module 701.

Size can vary from 8×8 pixels to 64×64 pixels. Each Coding Unit is predicted either by spatial prediction in Intra prediction module 708 or by motion prediction in motion estimation modules 712, 713 based on images already compressed stored in a reference memory 711.

During the compression, the Coding Mode of the Coding Unit is determined (INTRA parameters are calculated by the module 708 or INTER parameters are calculated by modules 713, 712) and the best mode between INTRA and INTER modes is made by a selection module 709. Once the current Coding Unit is predicted, the difference between the current Coding Unit and the predicted Coding Unit is calculated for being transformed in by a transformation module 702 and quantized by a quantization module 703.

Finally, an entropy coding module 704 constructs an elementary stream output by an output module 705.

The buffer of already decoded frames (711) is next filled with a new frame. This new frame is constructed by an inverse quantization (706), an inverse transform (707), an addition to the predicted frame and a post-processing filtering (710).

During the compression, some parameters are optimized.

For example, the compression algorithm optimizes the size of the Coding Units (module 701) by deciding the Coding Tree Units (CTU) subdivision (or "decomposition" in what follows) into a "quadtree" or according to any other subdivision pattern.

It also selects the best coding modes between INTER and INTRA prediction (module 709). The INTER mode is a global terminology and is composed of several modes: Inter, Skip and Skip-merge mode.

It also decides which image of the DPB is the better in terms of Rate-Distortion. However, this optimization requires computation time because many compression parameters are tested.

In what follows, the number of parameters explored during the compression stage is reduced. The properties of plenoptic images (e.g. high correlation between sub-aperture images) are advantageously used for restricting the research of the optimal parameters.

Because the set of explored parameters is reduced, run-time is reduced.

Optimization of the run-time is described in what follows with reference to FIGS. 8 to 17.

Figure 8:
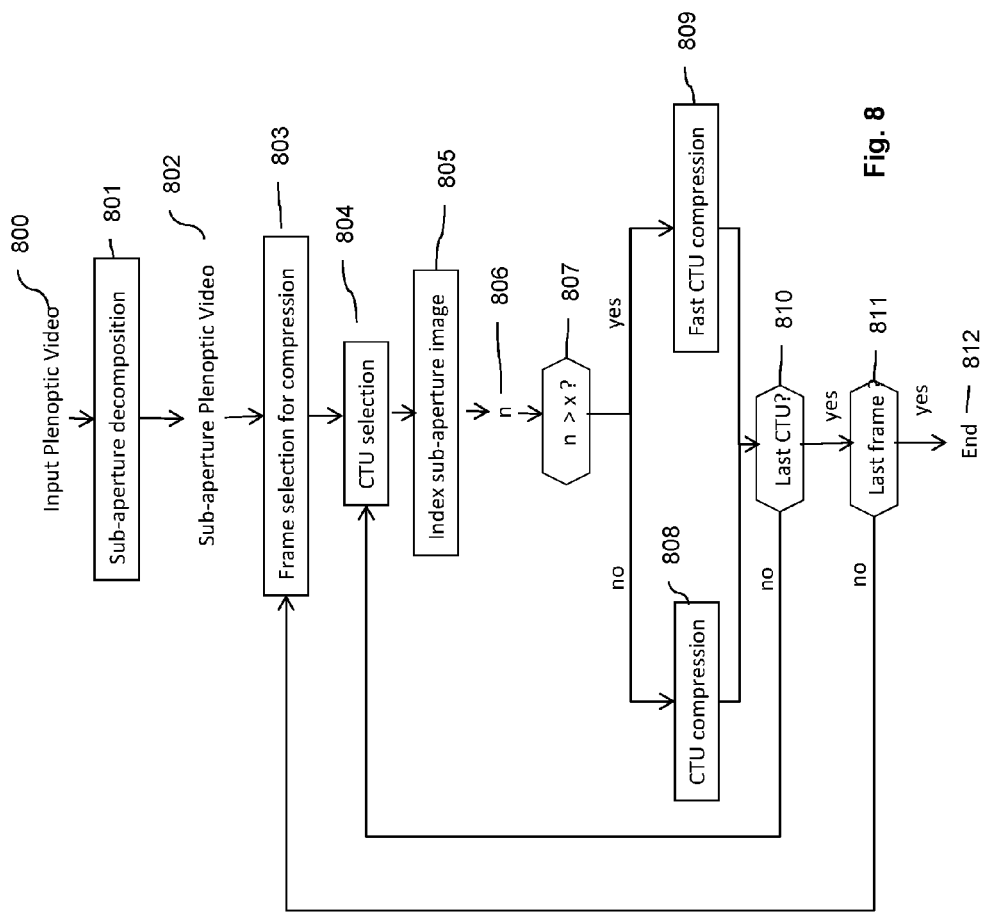
FIG. 8 is a flowchart of steps performed according to embodiments, FIG. 9 schematically illustrates CTU decompositions, FIGS. 10-11a-11b schematically illustrate encoding run-time optimization according to embodiments, FIG. 12 schematically illustrates depth filtering according to embodiments, FIGS. 13-16 schematically illustrate encoding run-time optimization according to embodiments, FIG. 17 schematically illustrate the control of the impact of encoding run-time optimization on encoding quality according to embodiments, FIG. 18 schematically illustrates a device according to embodiments.

FIG. 8 is a flowchart of steps performed according to embodiments.

In step 800, the input plenoptic video is made available. As previously explained, each image of this plenoptic video is decomposed into sub-aperture images in step 801. The sub-aperture decomposition makes it possible to generate the sub-aperture plenoptic video in step 802.

In step 803, each sub-aperture image of this video is selected for being compressed either by HEVC or by MV-HEVC. Each CTU is selected in step 804 for being compressed.

In step 805, the index of the sub-aperture image related to the selected CTU is extracted.

If MV-HEVC is used as the video codec, the index of the sub-aperture image is the layer index (described with reference to FIG. 6b) of the layer to be compressed and to which it belongs.

If HEVC is used as the video codec, the index of the sub-aperture image is its sub-aperture image index as described in the FIGS. 4b and 4c. For example, in FIG. 6a, the plenoptic image 627 is decomposed into four sub-aperture images. The first sub-aperture image 600 has (image) index "1". The second sub-aperture image 601 has (image) index "2". The third sub-aperture image 602 has (image) index "3". The fourth sub-aperture image 603 has (image) index "4". The plenoptic image 628 is also decomposed into four sub-aperture images. The first sub-aperture image 604 has (image) index "1". The second sub-aperture image 605 has (image) index "2". The third sub-aperture image 606 has (image) index "3". The fourth sub-aperture image 607 has (image) index "4".

Figure 6B:
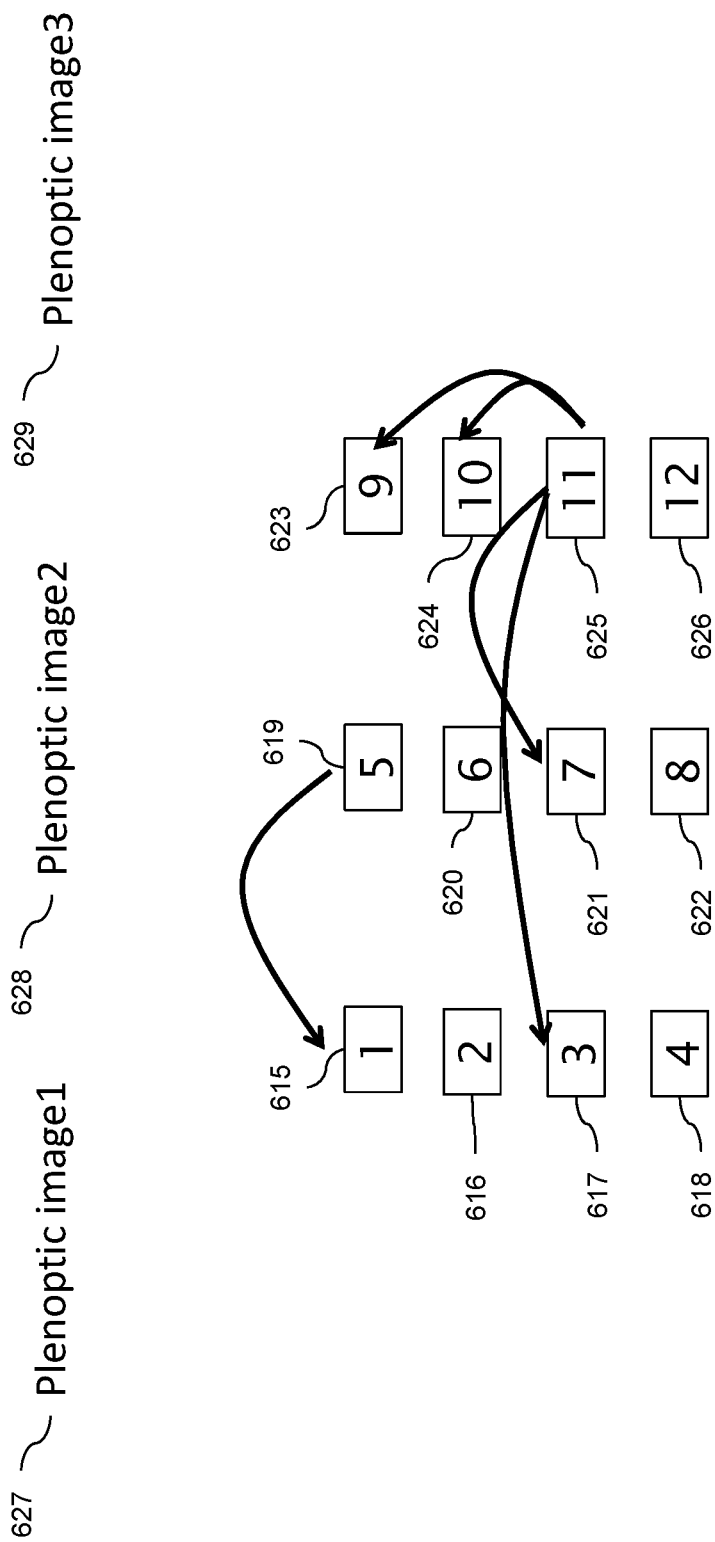

In FIG. 6b, the plenoptic image 627 is decomposed into four sub-aperture images. The first sub-aperture image 615 has (layer) index "1". This image is in the first layer/view of the multi-view video to be compressed. The second sub-aperture image 616 has (layer) index "2". This image is in the second layer/view of the multi-view video to be compressed. The third sub-aperture image 617 has (layer) index "3". This image is in the third layer/view of the multi-view video to be compressed. The fourth sub-aperture image 618 has (layer) index "4". This image is in the fourth layer/view of the multi-view video to be compressed. The second plenoptic image 628 is also decomposed into four sub-aperture images. The first sub-aperture image 619 has (layer) index "1". This image is in the first layer/view of the multi-view video to be compressed. The second sub-aperture image 620 has (layer) index "2". This image is in the second layer/view of the multi-view video to be compressed. The third sub-aperture image 621 has (layer) index "3". This image is in the third layer/view of the multi-view video to be compressed. The fourth sub-aperture image 622 has (layer) index "4". This image is in the fourth layer/view of the multi-view video to be compressed.

In FIG. 6*b*, the sub-aperture image index matches the layer index of MV-HEVC. A parameter "n" is determined in step 806. This parameter represents the index value of the sub-aperture image (this index is the sub-image index as defined in FIGS. 4*b*, 4*c* or the layer index depending on the video codec used). This parameter is compared in step 807 to a value 'x'. The value of parameter "n" and the value "x" depend on the type of optimization performed. Further details concerning these values are given hereinafter with reference to FIGS. 11, 13 and 15.

If the comparison is negative in step 807 (no), the value of parameter "n" is less or equal to x and then the current CTU is encoded without run-time optimization in step 808. It means that all the compression parameters used for compressing the current CTU are optimized and tested for seeking the best compression efficiency. For example, with reference to FIG. 7, the following optimizations are carried out.

Module 709 in charge of finding the best prediction mode (between INTER, INTRA) is optimized for compression efficiency. The best mode in terms of rate-distortion is searched for and selected.

Module 701 in charge of determining the decomposition (or subdivision) of the CTU into CUs is optimized for compression efficiency. The best decomposition is searched for and selected.

Module 713 in charge of finding the best reference image among the images stored and the best mode among the Inter, Skip and Skip-merge is optimized for compression efficiency.

Since the determination of the optimal parameters in terms of Rate-Distortion takes time, the compression run-time is not reduced.

If the comparison is positive in step 807, the value of "n" is greater than "x" and then the current CTU is encoded with a run-time optimization procedure in step 809. This procedure is referred in what follows to 'fast CTU compression'. Only a sub-set of the compression parameters used for compressing the current CTU is optimized for compression efficiency. Some of these parameters are set directly to a given value or only a sub-set of the possible parameters are optimized in terms of rate-distortion. The following examples are given in what follows.

With reference to FIGS. 9, 10, 11 and 12, the run-time optimization of module 701 (see FIG. 7) in charge of determining the decomposition (or subdivision) of the CTU into CU is described.

Figure 13:
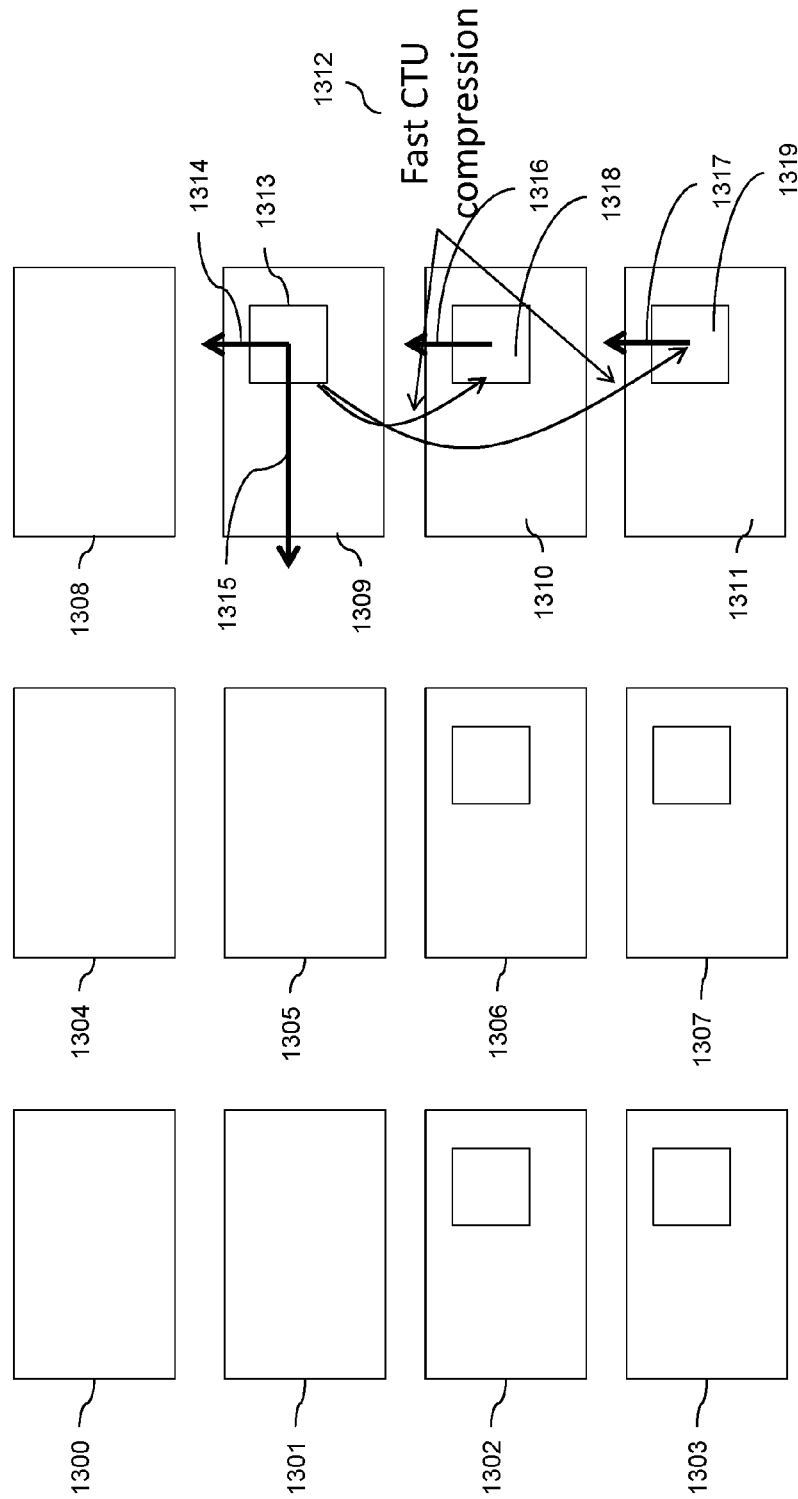
Figure 14:
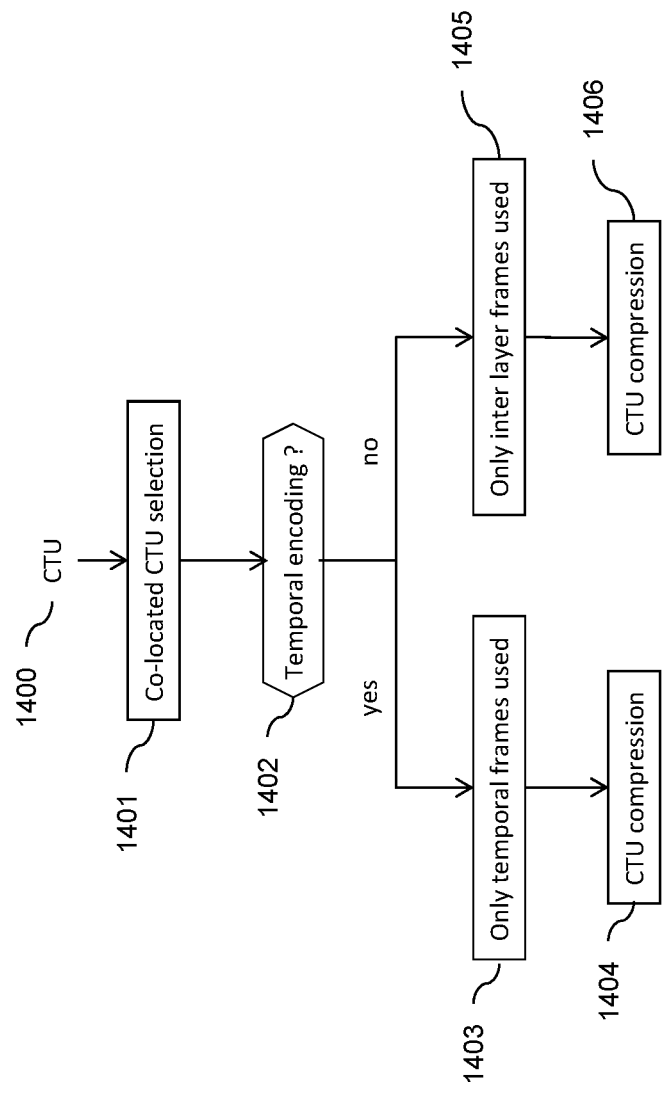

With reference to FIGS. 13 and 14, the run-time optimization of module 713 (see FIG. 7) in charge of finding the best reference image among the reference images stored in the reference memory 711 is described.

Figure 15:
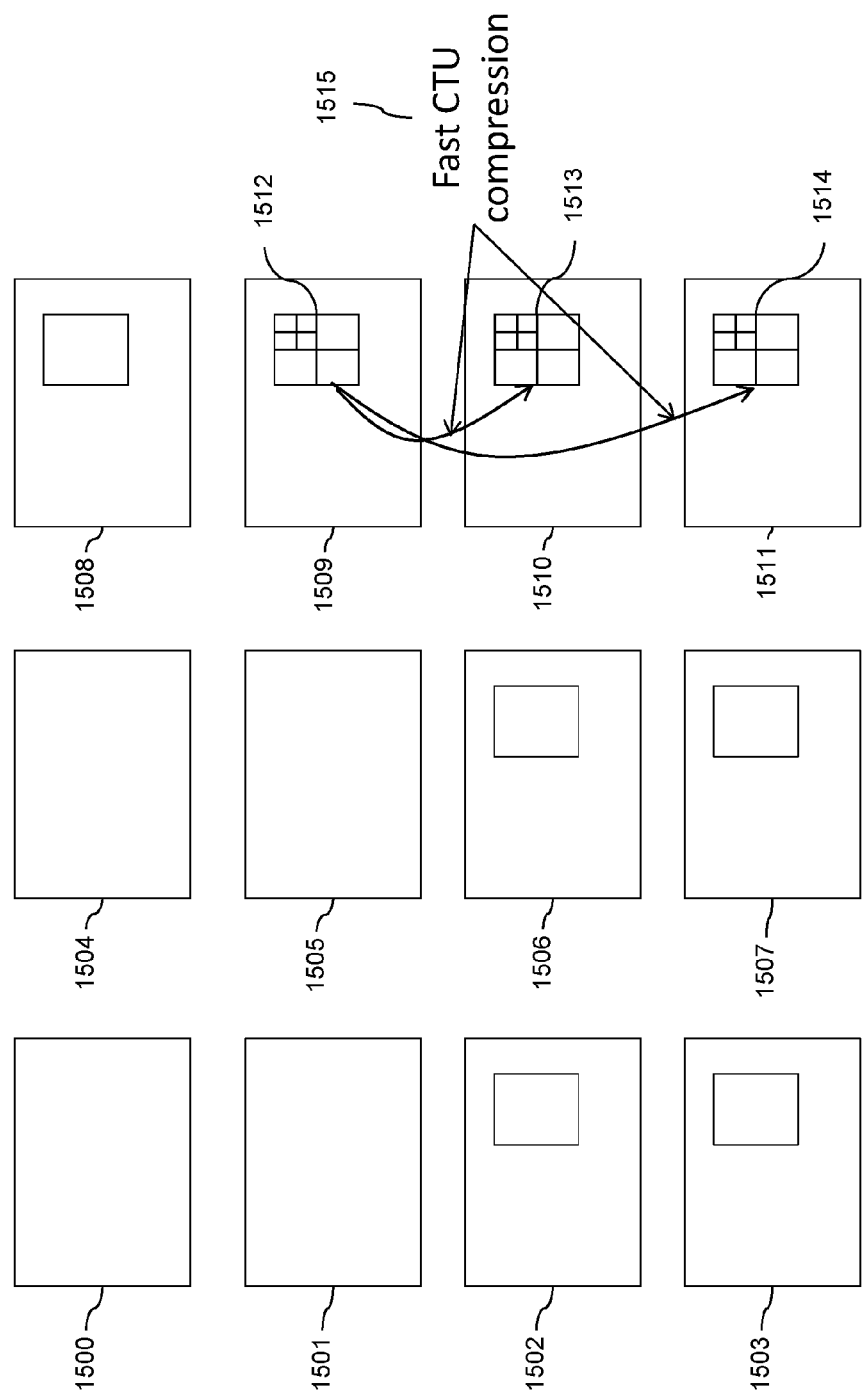
Figure 16:
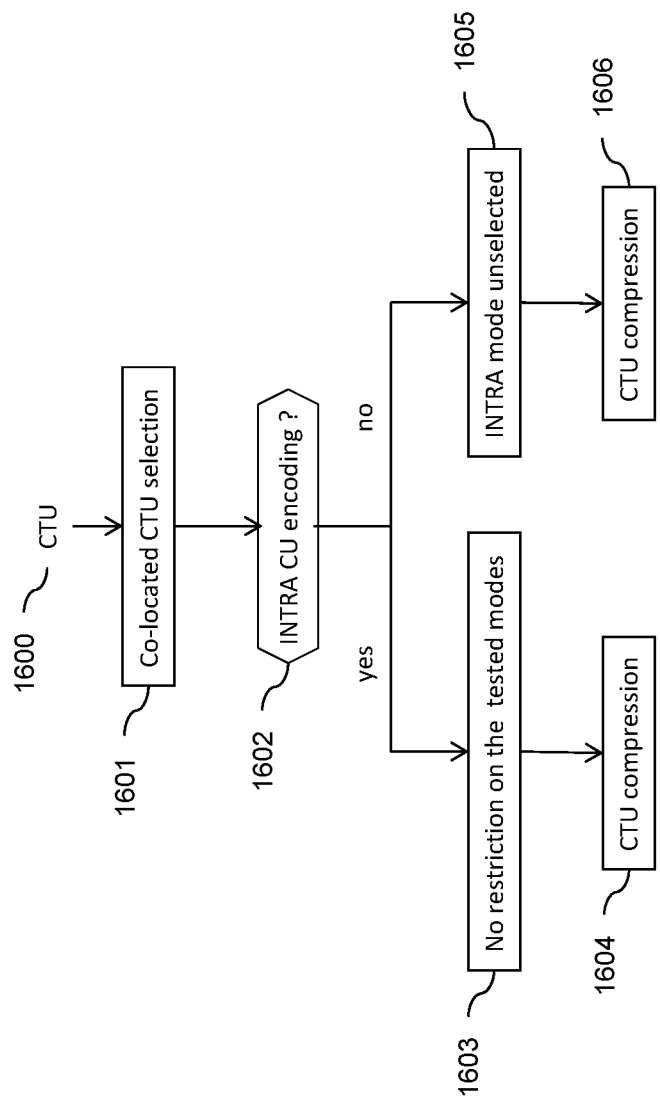

With reference to FIGS. 15 and 16, the run-time optimization of module 709 (see FIG. 7) in charge of finding the best prediction mode (between INTER, INTRA) is described. As described with reference to FIG. 7, the INTER mode is a global terminology and comprises three modes: Inter, Skip and Skip-merge mode.

Once the current CTU is encoded (in step 808 or 809), a test 810 is carried out for determining whether there is a new CTU to encode. In case there is (yes) a new CTU is selected in step 804. Otherwise (no), a test 811 is carried out for determining whether if there is a new image to encode. In case there is (yes), a new sub-aperture image is selected in step 803. Otherwise (no), the compression of the plenoptic video is ended in step 812.

Back to value 'x' in step 807, the lower the value 'x' the higher the number of images/layers encoded with the 'fast CTU compression'. For example, for the optimization described with reference to FIGS. 9, 10, 11 and 12, the value 'x' can be set to "1". This means that the fast CTU encoding can be applied on Layers 2, 3 and 4. For the optimization described with reference to FIGS. 13 and 14, the value 'x' is set to "2" ('x' can be set to a higher value but not to "1"). For the optimization described with reference to FIGS. 15 and 16, the value 'x' is set to "1".

From a general point of view, the lower the value of 'x' the higher the number of layers subject to the run-time optimization. However, according to the type of compression parameters considered (see the following description with reference to FIGS. 13 and 14), 'x' cannot always be set to "1".

Figure 9:
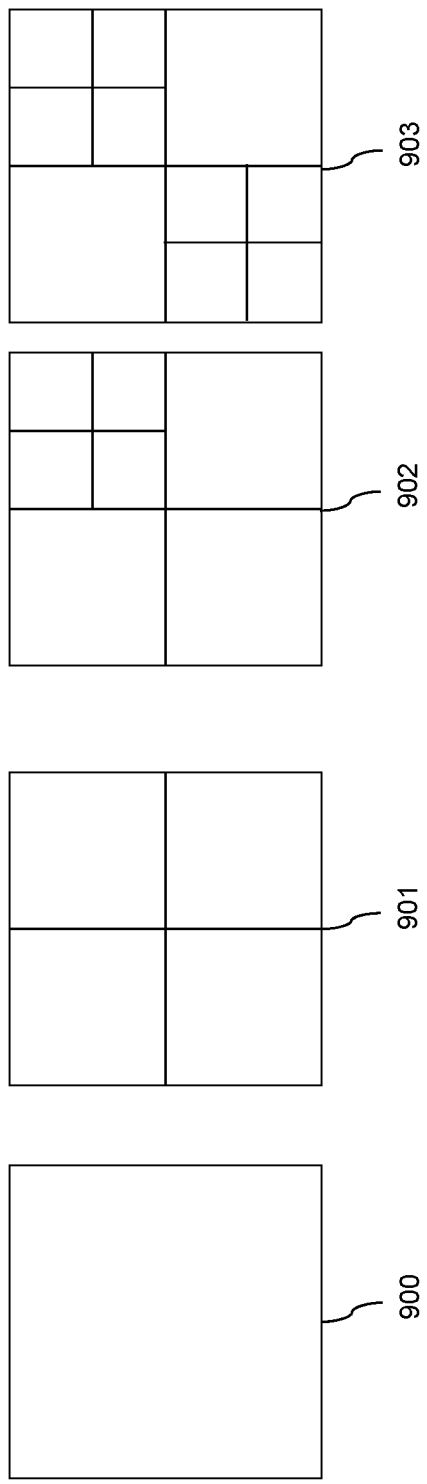

One of the compression modules that can be optimized for decreasing compression run-time of HEVC or MV-HEVC is the module in charge of the CTU decomposition into CUs. Different decompositions (or subdivisions) of the CTU into CUs are illustrated in FIG. 9. Various quadtree CTU decompositions are illustrated.

In decomposition 900, the CTU is not decomposed. The CU and the CTU are identical. The decomposition (or subdivision) depth is "0".

In decomposition 901, the CTU is decomposed into four CUs. The decomposition depth is "1".

In decomposition 902, the CTU is decomposed according to a quadtree into 7 CUs. The decomposition depth is "2".

In decomposition 903, the CTU is decomposed according to a quadtree into 10 CUs. The decomposition depth is "2".

The quadtree decomposition into CUs is not limited to a depth of "2". Higher quadtree depths are possible.

Figure 10:
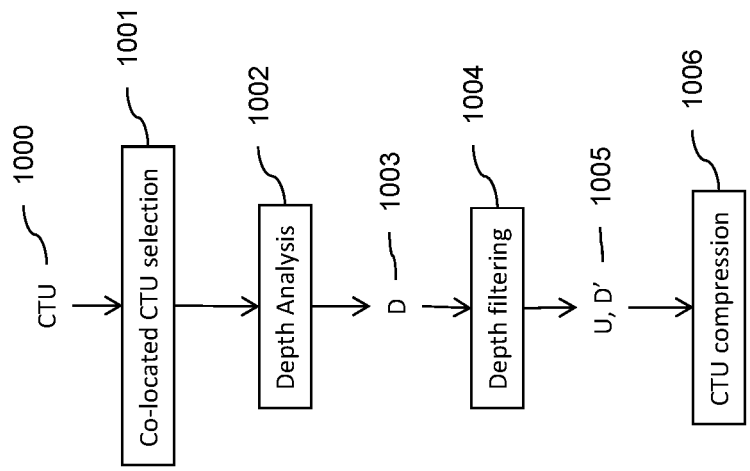

The fast CTU compression of step 809 (FIG. 8) is described in more details with reference to FIG. 10.

The run-time of the CTU compression is reduced by using only a sub-set of quadtree decomposition depths. During the compression of a CTU, it is split into CUs according to a quadtree decomposition. Each leaf of the quadtree is a CU. The texture of each CU is predicted. In order to find the optimal quadtree decomposition, a large amount of computations is needed.

The following process makes it possible to reduce the amount of computations needed, thereby reducing the run-time of the compression process.

In step 1000, a current non-encoded CTU is selected. The index of the sub-aperture image related to the current CTU is 'n'. The index is the layer index when MV-HEVC is used. It is also the sub-aperture index as defined in the FIGS. 4*b* and 4*c*. Indeed, for MV-HEVC, the sub-aperture index and the layer index are similar. When applied to HEVC (see FIG. 6*a*), the index is the sub-aperture index as defined in the FIGS. 4*b* and 4*c*.

Next, the co-located CTU in the sub-aperture image of index 'n−1' is selected in step 1001. A co-located CTU is a CTU located in a different layer/image with a same position (x,y). (x,y) can be viewed as the top-left corner of the CTU.

The sub-aperture images of indexes 'n' and 'n−1' are the sub-aperture images coming from the same initial plenoptic image. The sub-aperture image of index 'n−1' is assumed to be already encoded. Therefore, the co-located CTU is also already encoded.

In step 1002, a depth analysis is performed and the quadtree depth 'D' of this co-located CTU is extracted in step 1003.

Figure 12:
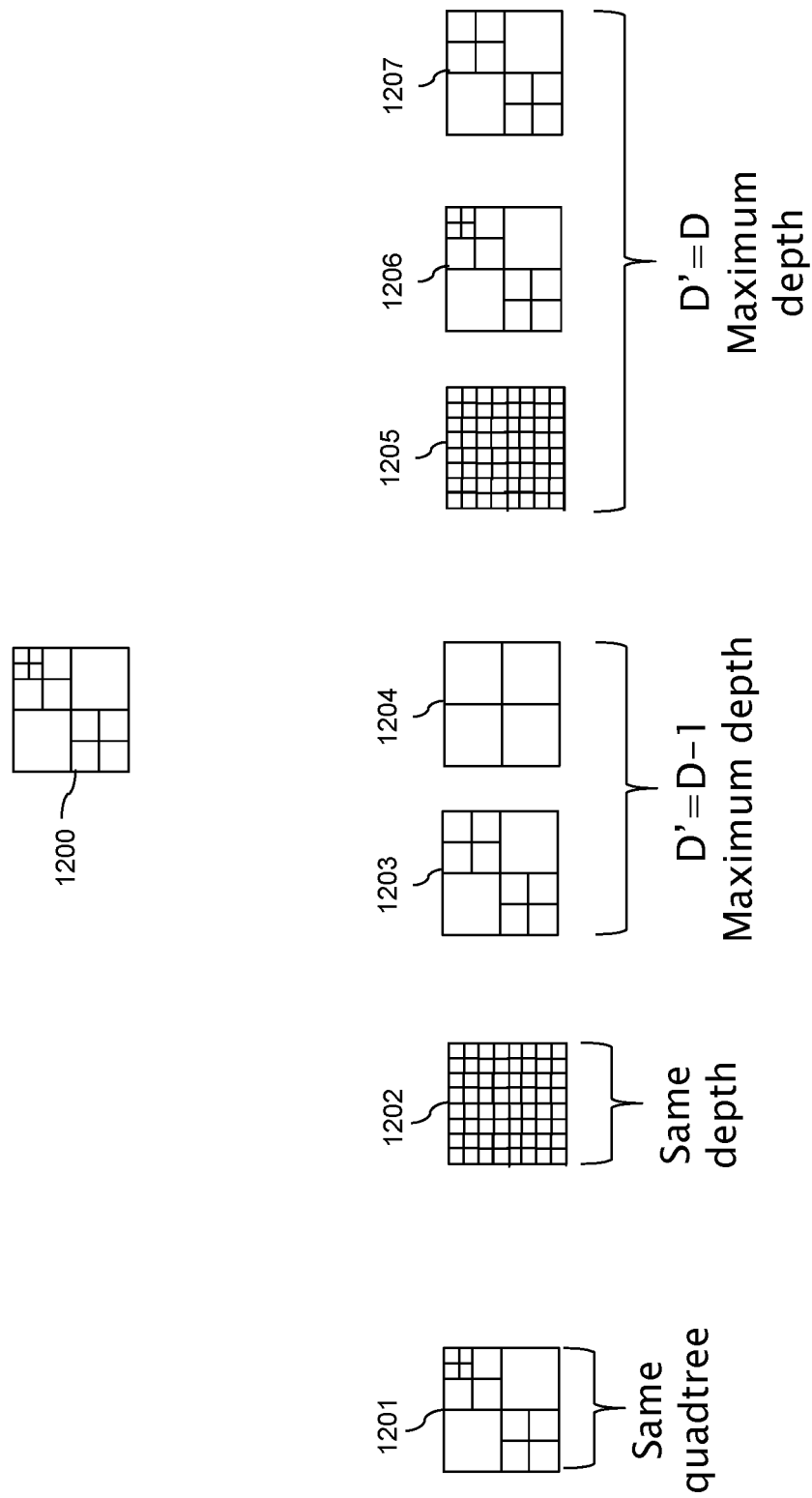

The extracted depth is filtered in step 1004 thereby giving two items:

A new depth 'D'' in step 1005 (Depth filtering is described in what follows with reference to FIG. 12).

A usage information called 'U' giving the instruction on how to use the filtered depth 'D''

This new depth and usage information will be used for the compression of the current CTU performed in step 1006. Four different configurations are possible for the Depth filtering module 1004:

U=−1: the quadtree decomposition of the CTU used in step 1006 is the same as the one of the co-located CTU of step 1001 (this is illustrated in FIG. 12, decomposition 1201). Only this quadtree configuration is tested in step 1006.

D'=D, U=0: only quadtree configurations with depth D' are be tested during the rate-distortion optimization in step 1006 (this is illustrated in FIG. 12, decomposition 1202).

D'=D−1, U=1: all the quadtree configurations (but by limiting the quadtree depth to D') are tested during the rate-distortion optimization in step 1006 (this is illustrated in FIG. 12, decompositions 1203, 1204).

D'=D, U=1: all the quadtree configurations (but by limiting the quadtree depth to D') are tested during the rate-distortion optimization (this is illustrated in FIG. 12, decompositions 1205, 1206, 1207).

With reference to FIG. 11a the run-time optimization of step 809 (FIG. 8) is described in the context of MV-HEVC.

A set of sub-aperture images 1100 to 1111 is represented. The sub-aperture image to be compressed is image 1110. The CTU to be compressed in image 1110 is CTU 1113. The sub-aperture image 1109 with index "2" (the layer index since MV-HEVC is used as the video codec) is considered to be already encoded. The fast CTU compression 1115 comprises the encoding of CTU 1113 by decomposing it into CUs according to the following steps.

The co-located CTU 1112, in image 1109, is selected. Image 1109 comes from the same plenoptic image as image 1110. Next, the quadtree depth of this CTU is extracted (in this case D=2). The quadtree depth is then filtered (Depth filtering is described in what follows with reference to FIG. 12). The result of the filtering is in the present example D'=−1. This means that the same quadtree decomposition is to be used during the compression of CTU 1113.

The same process for compressing CTU 1114 in image 1111 may be performed. The process described with reference to FIG. 11a may extended to HEVC embodiments as described with reference to FIG. 11b.

Figure 11B:
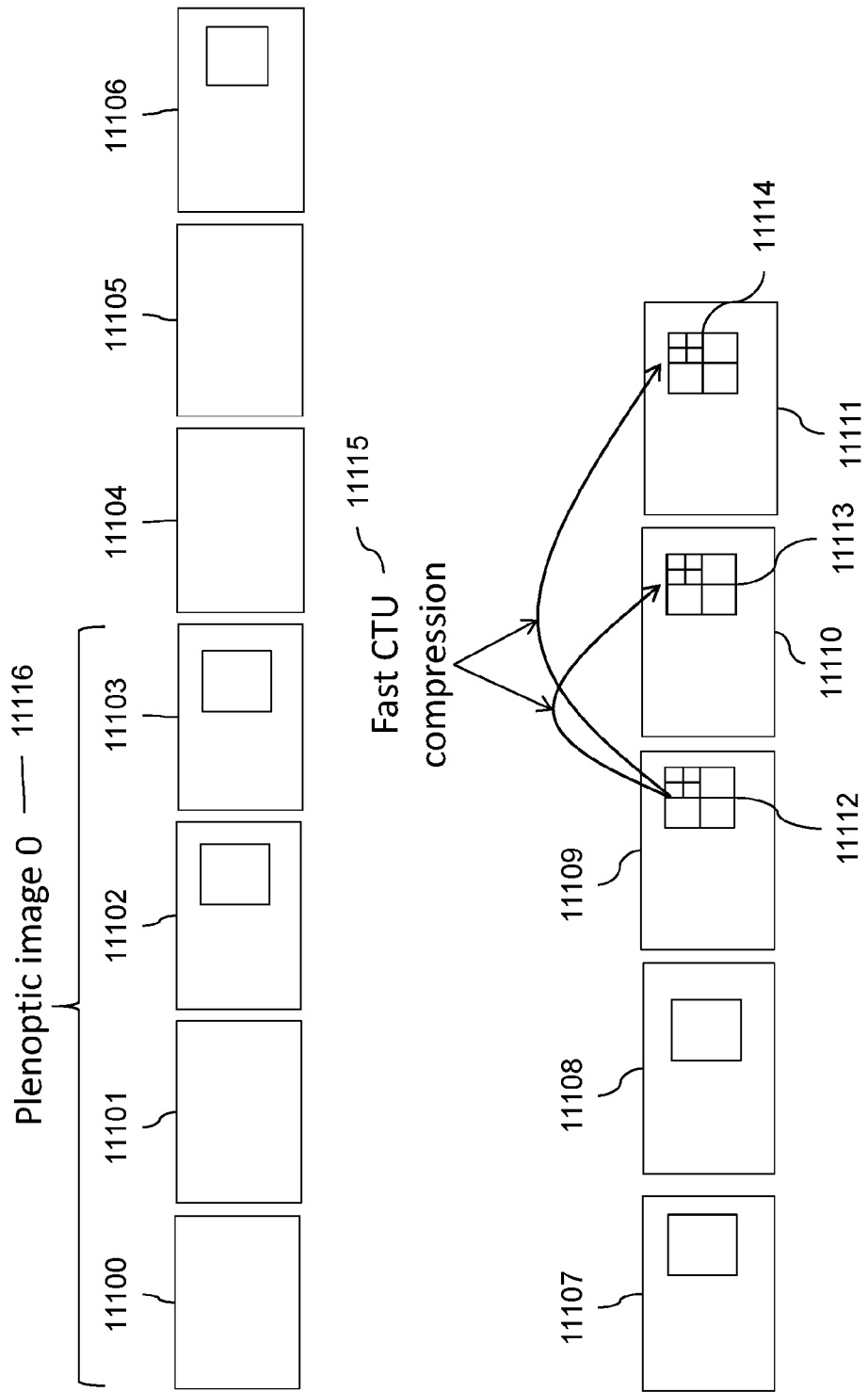

With reference to FIG. 11b the run-time optimization of step 809 (see FIG. 8) is described in the context of HEVC.

A set of sub-aperture images 11100 to 11111 is represented. Sub-aperture images 11100 to 11103 correspond to "Plenoptic image 0" 11116. Sub-aperture images 11104 to 11107 correspond to "Plenoptic image 1". Sub-aperture images 11108 to 11111 correspond to "Plenoptic image 2".

The sub-aperture image (or frame) to be compressed is image 11110. The sub-aperture index of this image is "3". The sub-aperture index is defined as in for the examples of FIG. 4b or FIG. 4c.

The CTU to be compressed in image 11110 is CTU 11113. The sub-aperture image 11109 with index "2" is considered to be already encoded. The fast CTU compression 11115 comprises the encoding of CTU 11113 by decomposing it into CUs according to the following steps.

The co-located CTU 11112, in image 11109, is selected. Image 11109 is a sub-aperture image coming from the same plenoptic image as the image 11110 to be compressed. Next, the quadtree depth of this CTU is extracted (in this case D=2). The quadtree depth is then filtered (Depth filtering is described in what follows with reference to FIG. 12). The result of the filtering is in the present example D'=−1. This means that the same quadtree decomposition is to be used during the compression of CTU 11113.

The same process for compressing CTU 11114 in image 11111 may be performed.

FIG. 12 illustrates different depth filtering results (step 1004 in FIG. 10) that can be used.

Starting from a co-located CTU 1200 already encoded. It is assumed that the CTU quadtree depth associated with this CTU is 'D'. The depth filtering may comprise:

the use of the same quadtree decomposition 1201. The usage information 'U' is set to −1. No definition of 'D'' is needed.

the use of the same depth 1202. Only quadtree configurations with the same depth as the co-located CTU 1200 are tested. The depth 'D'' is the depth 'D' measured in step 1200 and 'U' is set to 0.

the use of a "one-step" lower depth. The depth D' is set to D−1 and the maximal depth propagation (U=1) is used. For example, the depth of the co-located quadtree 1200 is "3", thus the depth of the current CTU is limited to "1" or "2". Two exemplary CTUs 1203 and 1204 are illustrated with such a decomposition.

the use of the same depth propagation (D'=D) and the maximal depth propagation (U=1). In such a case, quadtree configurations with depth strictly higher than the depth of the co-located CTU are not taken into account. This is illustrated with the exemplary CTUs 1205, 1206 and 1207.

Depth filtering modes that can be used may be as follows:

If the CTU is located on Layer 1 (n=1), no run-time optimization is performed: x=1.

If the co-located CTU is on Layer 1 and some of the CUs of this CTU are encoded with the INTRA mode, then the 'one-step lower depth' filtering is carried out for the CTUs on Layer 2 (n=2, x=1). Also, the depth usage is maximal: U=1, D'=D−1.

If the co-located CTU is on Layer 1 and all CUs are encoded with the INTER mode, then the maximal depth and the 'same depth' filtering are used is used for CTU on Layer 2 (n=2, x=1). We have D'=D, U=1.

If the co-located CTU is on Layer 2, the 'same depth filtering is used on Layer 3 (n=3, x=1). We have U=0, D'=D.

If the current CTU to be encoded is located on the last layer, then the 'same quadtree' filtering is used. We have U=−1.

The above embodiments have been described with the exemplary context of MV-HEVC. Other configurations may be used.

In the above examples, the indices 'n' and 'x' are related to the layer index. However, the notion of sub-aperture index may also be used because layer index and sub-aperture index are identical for MV-HEVC.

The above example may be extended to HEVC. In such a case, the value of 'n' and 'x' are no more layer indices but sub-aperture indices.

Another example of fast CTU compression in step 809 (FIG. 8) is described with reference to FIG. 13, in the MV-HEVC context.

A set of sub-aperture images 1300 to 1311 is represented. In the present example, a sub-set of the reference images stored in the Decoded Picture Buffer (711 in FIG. 7) are used by the motion estimation module (module 713 in FIG. 7). Since only a sub-set of reference images is used, compression time is reduced.

Before describing the fast compression mode, the regular (non-fast) compression mode is presented.

It is assumed that that the current image to be compressed is sub-aperture image 1309. In particular, it is assumed that the CTU to be encoded is CTU 1313. For the encoding of this CTU, images 1308, 1301 and 1305 can be used as references by the motion estimation module (Inter mode). The prediction process comprises:
  Testing the CTU quadtree configurations.
  Selecting each CU and searching the best mode between INTER and INTRA mode. For the INTER mode, the best mode between Inter, Skip-merge and Skip modes is tested.
  During the test of the Inter mode, finding among the three images of the DBP, the one that makes it possible to best predict the selected CU.

Once the CTU is encoded, a CTU quadtree configuration has been defined and some encoding modes (between INTRA, Inter, Skip-merge and Skip) have been defined.

For the CUs encoded by using the INTER mode, sub-aperture image 1308 can be used as the reference image. This is illustrated by arrow 1314 that points towards inter-layer sub-aperture images. Some other CUs are possibly encoded by using sub-aperture images 1301 or 1305 on the same layer. This is illustrated by arrow 1315 which points towards reference images on the same layer. The two arrows represent the orientation of the prediction.

More generally and in the context of the present embodiment, the proportion between CUs predicted by using the inter-layer prediction and CUs predicted by using the temporal prediction is calculated.

If the proportion of CUs using temporal prediction is higher than the proportion of CUs using the inter-layer prediction, the current CTU is classified as being 'temporal'. Otherwise, the CTU is classified as being 'inter-layer'. Arrow 1315 illustrates the 'temporal' case. Arrow 1314 illustrates the 'inter-layer' case. If all the CUs are encoded in INTRA mode, then the CTU is classified with the 'unknown' mode.

Sub-aperture images 1310 and 1311 illustrate a fast compression stage. It is first assumed that the current CTU to be encoded is CTU 1318. During the compression, different stages are run:
  the current CTU is decomposed into CUs, and
  for each CU, Inter prediction mode is tested and several reference images are tested. For example, for the CUs of CTU 1318, reference images 1309, 1308, 1302 and 1306 can be tested. It is searched for the PU (Prediction Unit) associated with each CU in each of these reference images the texture that predict as best as possible the PU texture.

With the fast CTU compression, the set of reference images is limited. The following steps are run:
  The co-located CTU 1313 in the previous layer is selected,
  The orientation of the prediction is analyzed (temporal, inter-layer or unknown),
  The set of reference images that do not match the orientation of the prediction are not selected.

For example, it is now assumed that the current CTU to be compressed is CTU 1318. The co-located CTU 1313 is selected. The prediction orientation is selected (choice between the orientations given by arrows 1314 and 1315). For example, arrow 1316 indicates that the prediction orientation of CTU 1313 is the inter-layer prediction. Thus, reference images 1302 and 1306 are not tested during the compression of the CTU. Only reference images 1309 and 1308 are tested. The same process may be performed for encoding CTU 1319.

If the mode of the co-located CTU is defined as 'unknown', then no run-time optimization can be launched for the current CTU to encode. All the reference frames located in the DPB will be used during the motion estimation process of the Inter mode.

For such an optimization, the value x (as defined in the step 807 in FIG. 8) is "1".

FIG. 14 is a flowchart of the steps performed for the fast CTU compression described with reference to FIG. 13.

The current CTU to be compressed is selected in step 1400. Next, in step 1401, the co-located CTU of the previous layer is selected.

A test is then carried out in step 1402 for determining whether the co-located CTU rather used, in proportion, the temporal prediction or the inter-layer prediction. As already explained with reference to FIG. 13, the orientation of the prediction of the co-located CTU may be obtained by calculating the proportion between CUs encoded using the inter-layer prediction and CUs encoded using the temporal prediction. If the proportion of CUs using temporal prediction is higher than the proportion of CUs using inter-layer prediction, the co-located CTU is classified as being 'temporal'. Otherwise, the co-located CTU is classified as being Inter-layer. For example, during test 1402 it is checked whether the co-located CTU has been classified 'temporal'. In such a case (yes), step 1403 is performed wherein only the temporal images located in the DPB are active and are potentially used during the motion estimation of the PU in step 1404. Back to test 1402, if the co-located CTU has been classified as 'interlayer' (no), step 1405 is performed wherein only the inter-layer images located in the DPB are active and are potentially used during the motion estimation of the PU in step 1406. If the mode of the co-located CU is classified as 'unknown', then no fast optimization is conducted and all the reference frames of the DPB are used during the rate-distortion optimization.

The process described with reference to FIG. 14 makes it possible to reduce the compression time because fewer images are used during the motion estimation (in module 713 of FIG. 7) at the PU stage.

Another example of fast CTU compression in step 809 (FIG. 8) is described with reference to FIG. 15, in the MV-HEVC context.

A set of sub-aperture images 1500 to 1511 is represented. In the present example, a sub-set of the CU compression modes is used during the compression. For example, during a regular (non-fast) compression stage, each CU of the CTU can be encoded either in INTER mode or in INTRA mode and according to the present fast compression process, the INTRA mode may be abandoned before starting the compression of the CTU. Since this mode is not tested thereafter, compression time is reduced.

Before describing the fast compression mode, the regular (non-fast) compression mode is presented.

It is assumed that the current image to be compressed is sub-aperture image 1509. In particular, it is assumed that the CTU to be encoded is CTU 1512. For the encoding of this CTU, the prediction process comprises:

selecting each CU of the current CTU while different CTU configurations are tested, and determining the best mode between INTER and INTRA modes for predicting the PUs associated with the CUs of the CTU quadtree.

Once the prediction process ends (the best quadtree configuration has been calculated and the selection between INTER and INTRA prediction is made for each CU associated to the quadtree configuration), a given set of CUs have been encoded with the INTRA mode whereas other have been encoded with the INTER mode.

However, in some cases, INTRA mode may be less efficient than INTER mode. In particular, this may be the case for sub-aperture images that are highly correlated (inter-layer correlation or temporal correlation).

Consequently, many CTUs may be encoded without having CUs encoded using the INTRA mode. Furthermore, if INTRA mode is not used on layer '1' for a given CTU, the probability of using it on a layer of higher index for a co-located CTU is very low.

Back to the fast compression mode, the fast compression mode is illustrated using sub-aperture images 1510 and 1511. For instance, the current CTU to be encoded is CTU 1513. During the fast compression, the following steps are carried out.

The co-located CTU 1512 in the previous layer is selected. Next, a test is carried out for determining whether some of the CUs of the co-located CTU use INTRA prediction. If the test is negative, the INTRA prediction is not tested for the CUs of the current CTU 1513.

The same fast processing may be performed for CTU 1514. For this CTU, the co-located CTU can be either CTU 1513 or CTU 1512.

FIG. 15 illustrates the multi-view compression case in the MV-HEVC context. However, this solution may be directly extended to HEVC. In such a case, the co-located CTU is selected on the sub-aperture image whose sub-aperture index (as defined in with reference to FIGS. 4b, 4c) is lower than the one used for the current image to encode. The current sub-aperture image (the one being coded) and the reference sub-aperture image (the one wherein the co-located CTU is selected) have to come from a same plenoptic image. Once the co-located CTU is selected, a test is performed for determining whether the INTRA mode has been used for at least one of the CUs. In case the test is negative, the INTRA mode is discarded from the tested modes for the encoding of the current CTU.

FIG. 16 is a flowchart of steps performed for the fast CTU compression described with reference to FIG. 15.

The current CTU to be compressed is selected in step 1600. Next, during step 1601, the co-located CTU of a previous layer is selected.

A test is then conducted in step 1602 for determining whether the co-located CTU (already encoded) has some CUs encoded with the INTRA mode.

If the test is positive (yes), then step 1603 is carried out wherein the compression modes are tested without restriction for compressing the CTU in step 1604.

If the test is negative (no), then step 1605 is carried out wherein only INTRA mode is ignored and only the INTER prediction is used for compressing the CTU in step 1606. Since the INTRA mode is not tested, the encoding time is reduced when compared to a regular (non-fast) compression stage.

Embodiments have been described hereinabove wherein plenoptic videos compression has been made faster by slightly lowering the compression quality.

Figure 17:
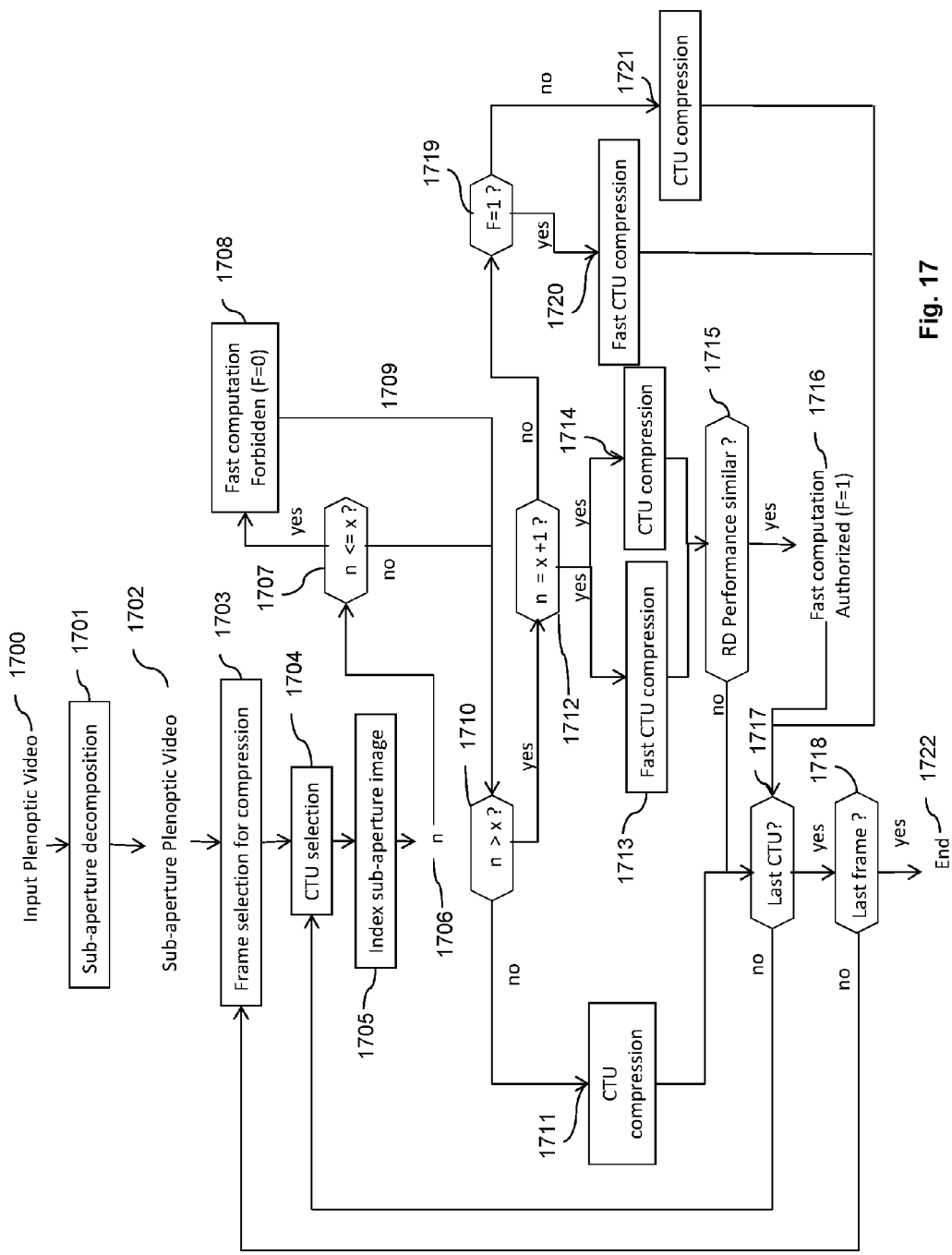

With reference to FIG. 17, a method for controlling the impact of the fast computation on the compression quality is described. More precisely, it is described how to decide (at the CTU level) whether fast CTU compression optimization should be used or not.

In step 1700, the input plenoptic video is made available. As previously explained, each image of this plenoptic video is decomposed in step 1701 into sub-aperture images thereby obtaining a sub-aperture plenoptic video in step 1702.

Operations 1703 to 1722 relate to the optimization process for the current plenoptic image. These operations are carried out for the sub-aperture images associated with the current plenoptic image. For example, with reference to FIGS. 6a and 6b, four sub-aperture images are associated with each plenoptic image.

In step 1703, each sub-aperture image of this video is selected for being compressed either by HEVC or by MV-HEVC. Each CTU of a current image is selected in step 1704 for being compressed. In step 1705, the index of the sub-aperture image related to the selected CTU is extracted.

If MV-HEVC is used as the video codec, the index of the sub-aperture image is the layer index (described with reference to FIG. 6b) of the layer to be compressed and to which it belongs. This layer index matches the sub-aperture index as defined with reference to FIGS. 4b and 4c.

If HEVC is used as the video codec, the index of the sub-aperture image is its sub-aperture image index (described with reference to FIGS. 4b and 4c).

In step 1706, parameter 'n' is set to the value extracted in step 1705.

This index value is compared in step 1707 to a value 'x'. Value 'n' and 'x' depend on the type of optimization made. If 'n' is less or equal to 'x' (yes), then the current CTU is encoded without run-time optimization. A flag 'F' indicating whether fast optimization is authorized or not is set to "0" in step 1708. This flag F is associated with the current CTU and with the co-located CTU for the higher layers (in case of MV-HEVC) and with the co-located CTU for the higher sub-aperture image indices (in case of HEVC). In other words, a flag F is defined for all the CTU located at the same position across the layers. The process then goes to step 1710.

Thus, all the compression parameters for compressing the current CTU are optimized for finding the best compression efficiency. For example, with reference to FIG. 7:

module 709 in charge of finding the best prediction mode (between INTER, INTRA) finds the best mode in terms of rate-distortion for all the CTU quadtree decomposition tested, module 701 in charge of determining the decomposition of the CTU into CUs finds the best decomposition, module 713 in charge of motion estimation finds the best reference image among the images stored.

Since the determination of the optimal parameters in terms of Rate-Distortion takes time, the compression run-time is not reduced.

Back to step 1707, if 'n' is not less or equal to 'x' (no), the value of the flag 'F' is not changed (how the decision of triggering run-time optimization is described in what follows). The process goes to step 1710.

During step 1710, it is tested whether 'n' is strictly greater than 'x'. In case the test is negative (no), the regular (non-fast) CTU compression is performed in step 1711. Once the CTU is compressed, a test is carried out in step 1717 for determining whether the current CTU is the last CTU of the image. If the test is negative (no), the next CTU is selected in step 1704. Otherwise, test 1718 is performed for determining whether the current image is the last image of the video. In the test is positive, the compression end in step 1722. Otherwise, a new image is selected for being compressed in step 1703.

Back to test 1710, if it is positive, and 'n' is strictly greater than 'x', (yes), it is compared in step 1712 whether 'n' equals "x+1".

If the test is positive (yes), the compression of the CTU is performed according to 2 methods in parallel:
the regular (non-fast) CTU compression in step 1714, and
the fast CTU computation in step 1713.

Only the compression parameters calculated for the CTU compression in step 1714 are used for the generation of the elementary stream. However, the Rate-Distortion performance between the fast (1713) and regular (non-fast) (1714) CTU compression are compared in step 1715.

If the performances are similar (yes), the fast compression is authorized in step 1716 (by setting flag 'F' to "1") for the co-located CTU at a higher layer (co-located CTU at layers n+1, n+2, n+3 . . . ) or for the higher sub-aperture indices. The process then goes to step 1717.

Otherwise (no), flag 'F' remains unchanged and the process goes directly to step 1717.

Back to test 1712, if it is negative (no), step 1719 is carried out wherein flag 'F' is read.

If this flag is set to "1" (yes), the fast compression is carried out in step 1720. Otherwise, the flag is set to "0" (no) and the current CTU is encoded according to the regular (non-fast) CTU compression in step 1721. Steps 1720 and 1721 are not carried out in parallel like steps 1712 and 1714.

After step 1720 or 1721 (depending on the result of test 1719), the process goes to step 1717.

According to the above process, the regular (non-fast) CTU compression is compared to the fast CTU compression (step 1715). For example, this comparison is carried out for layer n=2. If this comparison is positive, the co-located CTU for the layers n=3, 4 . . . is encoded with the fast compression. This fast compression can be one of the fast compression modes described with reference to FIGS. 9 to 16 or a combination of these modes.

The Rate-Distortion performances (tested in step 1715) are considered as similar for the fast and regular (non-fast) compression if the value $R+\lambda D$ (wherein R is the rate of the CTU, $\lambda$ is a constant, D is the distortion associated to the CTU) does not vary more than 10% between the fast CTU compression (1713) and the normal CTU compression (1714). For example, if the value $V2=R2+\lambda D2$ (with optimization) is not higher than 10% in comparison to the value $V1=R1+\lambda D1$ (without optimization) then the optimization is authorized. Other criteria may be used for estimating the Rate-Distortion performances.

Figure 18:
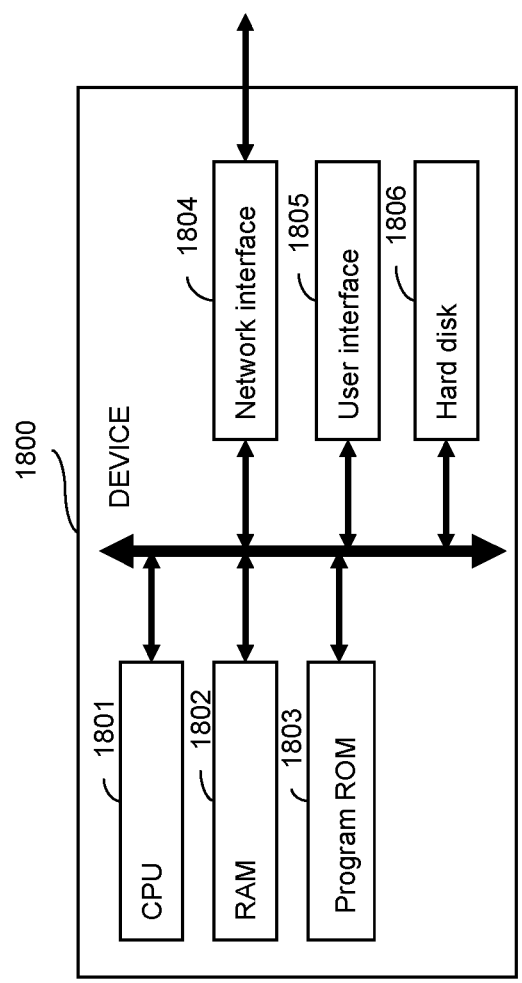

FIG. 18 is a schematic block diagram of a device 1800 for implementing one or more embodiments of the invention. The device 1800 comprises a communication bus connected to:

a central processing unit 1801, such as a microprocessor, denoted CPU;

a random access memory 1802, denoted RAM, for storing the executable code of the method of embodiments of the invention as well as the registers adapted to record variables and parameters necessary for implementing a method according to embodiments, the memory capacity thereof can be expanded by an optional RAM connected to an expansion port for example;

a read only memory 1803, denoted ROM, for storing computer programs for implementing embodiments of the invention;

a network interface 1804 is typically connected to a communication network over which digital data to be processed are transmitted or received. The network interface 1804 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1801;

a user interface 1805 for receiving inputs from a user or to display information to a user;

a hard disk 1806 denoted HD an I/O module 1807 for receiving/sending data from/to external devices such as a video source or display The executable code may be stored either in read only memory 1803, on the hard disk 1806 or on a removable digital medium such as for example a disk. According to a variant, the executable code of the programs can be received by means of a communication network, via the network interface 1804, in order to be stored in one of the storage means of the communication device 1800, such as the hard disk 1806, before being executed.

The central processing unit 1801 is adapted to control and direct the execution of the instructions or portions of software code of the program or programs according to embodiments of the invention, which instructions are stored in one of the aforementioned storage means. After powering on, the CPU 1801 is capable of executing instructions from main RAM memory 1802 relating to a software application after those instructions have been loaded from the program ROM 1803 or the hard-disc (HD) 1806 for example. Such a software application, when executed by the CPU 1801, causes the steps of a method according to embodiments to be performed.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A device for encoding a plenoptic image comprising:
a memory for storing at least one program; and
a processor coupled to the memory, the processor operating to execute the at least one program to:
decompose the plenoptic image into sub-aperture images,
encode at least a part of a first sub-aperture image using a set of encoding parameters, and
encode at least a part of a second sub-aperture image using restricted number of parameters among the set of encoding parameters;
wherein at least one encoding parameter of the restricted number of encoding parameters is a subdivision pattern for subdividing the part of the first sub-aperture image to be encoded; and
wherein at least one subdivision pattern is discarded in view of encoding the part of the second sub-aperture image.

2. The device according to claim 1, wherein the part of the first sub-aperture image and the part of the second sub-aperture image are collocated in the first sub-aperture image and the second sub-aperture image.

3. The device according to claim 1, wherein the sub-aperture images are indexed and the second sub-aperture image has an index value higher than an index value of the first sub-aperture image.

4. The device according to claim 1, wherein the sub-aperture images are indexed and organized into layers, wherein the layers are indexed, and wherein the second sub-aperture image belongs to a layer having an index value higher than an index value of a layer to which belongs the first sub-aperture image.

5. The device according to claim 1, wherein the processor is configured to optimize the encoding parameters before the encoding of the part of the first sub-aperture image.

6. The device according to claim 1, wherein at least one encoding parameter of the restricted number of encoding parameters is an encoding mode and wherein at least one encoding mode is discarded when encoding the part of the second sub-aperture image.

7. The device according to claim 1, wherein the subdivision pattern used for subdividing the part of the second sub-aperture image is limited to a subdivision pattern used for subdividing the already encoded part of the first sub-aperture image to be used for encoding the part of the second sub-aperture image.

8. The device according to claim 1, wherein the subdivision pattern used for subdividing the part of the second sub-aperture image is searched for in a set of subdivision patterns, the set of subdivision patterns being defined based on a subdivision depth of a subdivision pattern used for subdividing the already encoded part of the first sub-aperture image to be used for encoding the part of the second sub-aperture image.

9. The device according to claim 1, wherein the set of subdivision patterns comprises patterns having a same subdivision depth as the subdivision pattern used for subdividing the already encoded part of the first sub-aperture image to be used for encoding the part of the second sub-aperture image.

10. The device according to claim 1, wherein the set of subdivision patterns comprises patterns having a subdivision depth lower than the subdivision depth of the subdivision pattern used for subdividing the already encoded part of the first sub-aperture image to be used for encoding the part of the second sub-aperture image.

11. The device according to claim 1, wherein the at least one subdivision pattern is discarded based on a position of the part of the second sub-aperture image to be encoded according to an index order for the encoding of the sub-aperture images of the plenoptic image.

12. The device according to claim 1, wherein at least one parameter of the restricted number of parameters is a reference image type for encoding the part of the second sub-aperture image and wherein at least one reference image type is discarded in view of encoding the part of the second sub-aperture image.

13. The device according to claim 12, wherein the at least one reference image type is discarded based on at least one encoding type used for encoding subdivisions of the already encoded part of the first sub-aperture image to be used for encoding the part of the second sub-aperture image.

14. The device according to claim 13, wherein the at least one encoding type is at least one of:
a temporal encoding, and/or
an inter-layer encoding and/or
a spatial encoding.

15. The device according to claim 1,
wherein, for at least one part of the first or the second sub-aperture image to be encoded, both a first encoding and a second encoding are performed,
wherein the first encoding uses the set of encoding parameters and the second encoding uses the restricted number of parameters among the set of encoding parameters,
wherein a performance indicator is evaluated for the first and second encoding, and
wherein a selection between encoding with the set of parameters or the restricted number of parameters optimization is performed for encoding subsequent parts of sub-aperture images based on the evaluated performance indicator.

* * * * *